(12) United States Patent
Steinberg et al.

(10) Patent No.: US 11,671,645 B2
(45) Date of Patent: *Jun. 6, 2023

(54) SYSTEM AND METHOD FOR CREATING CUSTOMIZED, MULTI-PLATFORM VIDEO PROGRAMMING

(71) Applicants: John Douglas Steinberg, Millbrae, CA (US); Arthur H. Muir, San Mateo, CA (US)

(72) Inventors: John Douglas Steinberg, Millbrae, CA (US); Arthur H. Muir, San Mateo, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 17/506,217

(22) Filed: Oct. 20, 2021

(65) Prior Publication Data
US 2022/0150562 A1  May 12, 2022

Related U.S. Application Data

(63) Continuation of application No. 16/206,040, filed on Nov. 30, 2018, now Pat. No. 11,178,442, which is a
(Continued)

(51) Int. Cl.
*H04N 21/266* (2011.01)
*H04N 21/2668* (2011.01)
(Continued)

(52) U.S. Cl.
CPC ....... *H04N 21/2668* (2013.01); *G11B 27/034* (2013.01); *G11B 27/34* (2013.01);
(Continued)

(58) Field of Classification Search
CPC .......... H04N 21/2668; H04N 21/2387; H04N 21/25891; H04N 21/6125; H04N 21/8352;
(Continued)

(56) References Cited

U.S. PATENT DOCUMENTS 4,143,978 A * 3/1979 Anderson ............... G09C 3/08
380/51
6,642,938 B1  11/2003 Gilboy
(Continued)

FOREIGN PATENT DOCUMENTS

CA  2600207  9/2006
EP  1550129  7/2005
(Continued)

OTHER PUBLICATIONS

Al-Hajri, et al., Video Navigation with a Personal Viewing History.
(Continued)

*Primary Examiner* — Jefferey F Harold
*Assistant Examiner* — Timothy R Newlin
(74) *Attorney, Agent, or Firm* — Knobbe, Martens, Olson & Bear, LLP

(57) ABSTRACT

Systems and methods for representing video and audio media files as workflows are disclosed. In some cases, the systems and methods combine segments of the media files into larger compilations in the workflows, and using the workflows to individually optimize both the viewing experience for and the advertising presented to viewers based upon the circumstances of each viewer and parameters described with the workflow.

20 Claims, 19 Drawing Sheets

Related U.S. Application Data continuation of application No. 15/233,336, filed on Aug. 10, 2016, now Pat. No. 10,158,901, which is a continuation of application No. 14/082,578, filed on Nov. 18, 2013, now Pat. No. 9,432,711.

(60) Provisional application No. 61/796,724, filed on Nov. 19, 2012.

(51) Int. Cl.

| | | |
|---|---|---|
| *H04N 21/234* | (2011.01) | |
| *H04N 21/81* | (2011.01) | |
| *G11B 27/034* | (2006.01) | |
| *G11B 27/34* | (2006.01) | |
| *H04N 21/2387* | (2011.01) | |
| *H04N 21/258* | (2011.01) | |
| *H04N 21/61* | (2011.01) | |
| *H04N 21/8352* | (2011.01) | |
| *H04N 21/84* | (2011.01) | |

(52) U.S. Cl.
CPC ... *H04N 21/2387* (2013.01); *H04N 21/23424* (2013.01); *H04N 21/25891* (2013.01); *H04N 21/6125* (2013.01); *H04N 21/812* (2013.01); *H04N 21/8352* (2013.01); *H04N 21/84* (2013.01)

(58) Field of Classification Search
CPC ............. H04N 21/84; H04N 21/23424; H04N 21/812; G11B 27/034; G11B 27/34
See application file for complete search history.

(56) References Cited

U.S. PATENT DOCUMENTS

| | | | |
|---|---|---|---|
| 6,778,759 B1 | 8/2004 | Yamada et al. | |
| 7,089,579 B1 | 8/2006 | Mao et al. | |
| 7,346,659 B2 | 3/2008 | Wong | |
| 7,986,707 B2 | 2/2011 | Dettori et al. | |
| 7,941,033 B2 | 5/2011 | Kato | |
| 8,001,486 B2 | 8/2011 | Kumar et al. | |
| 8,026,805 B1* | 9/2011 | Rowe | H04N 21/43615 |
| | | | 340/573.1 |
| 8,312,486 B1 | 11/2012 | Briggs et al. | |
| 8,363,716 B2 | 1/2013 | Kalva et al. | |
| 8,370,357 B1 | 2/2013 | Gudmundsson et al. | |
| 8,370,885 B1 | 2/2013 | Gilboy | |
| 8,375,039 B2 | 2/2013 | Schwartz et al. | |
| 8,381,254 B2 | 2/2013 | Adolph et al. | |
| 8,392,834 B2 | 3/2013 | Obrador | |
| 8,406,610 B2 | 4/2013 | Carney et al. | |
| 8,413,205 B2 | 4/2013 | Carney et al. | |
| 8,423,417 B2 | 4/2013 | Heck et al. | |
| 8,424,036 B2 | 4/2013 | Haberman et al. | |
| 8,433,182 B2 | 4/2013 | Wood et al. | |
| 8,434,103 B2 | 4/2013 | Tsuchida et al. | |
| 8,434,104 B2 | 4/2013 | Weihs et al. | |
| 8,437,409 B2 | 5/2013 | Scherlis et al. | |
| 8,437,612 B2 | 5/2013 | Jung et al. | |
| 8,438,595 B1 | 5/2013 | Kannan | |
| 8,438,602 B2 | 5/2013 | Rao | |
| 8,443,411 B2 | 5/2013 | Gauld | |
| 8,453,190 B2 | 5/2013 | Liwerant et al. | |
| 8,473,993 B2 | 6/2013 | Athias | |
| 8,474,713 B2 | 7/2013 | Dmitriev | |
| 8,479,228 B1 | 7/2013 | Simon et al. | |
| 8,479,239 B2 | 7/2013 | Kelly | |
| 8,495,694 B2 | 7/2013 | Girouard et al. | |
| 8,510,227 B2 | 8/2013 | Mir et al. | |
| 8,510,555 B2 | 8/2013 | Tam | |
| 8,521,779 B2 | 8/2013 | Hodgkinson et al. | |
| 8,522,268 B2 | 8/2013 | Chen et al. | |
| 8,522,272 B2 | 8/2013 | Adimatyam et al. | |
| 8,522,273 B2 | 8/2013 | Huber et al. | |
| 8,522,300 B2 | 8/2013 | Relyea et al. | |
| 8,522,301 B2 | 8/2013 | Zalewski | |
| 8,589,992 B2 | 11/2013 | Babic | |
| 8,615,517 B1 | 12/2013 | Vice et al. | |
| 8,644,679 B2 | 2/2014 | Haot et al. | |
| 8,656,398 B2 | 2/2014 | Alexander | |
| 8,676,900 B2 | 3/2014 | Yruski et al. | |
| 9,043,820 B2* | 5/2015 | Shah | H04N 21/44226 |
| | | | 725/14 |
| 2001/0042249 A1* | 11/2001 | Knepper | H04N 7/17318 |
| | | | 348/E7.071 |
| 2002/0053078 A1 | 5/2002 | Holtz et al. | |
| 2002/0144262 A1* | 10/2002 | Plotnick | H04N 21/812 |
| | | | 348/E7.071 |
| 2002/0184634 A1 | 12/2002 | Cooper | |
| 2003/0018966 A1 | 1/2003 | Cook et al. | |
| 2003/0084441 A1 | 5/2003 | Hunt | |
| 2003/0093790 A1 | 5/2003 | Logan et al. | |
| 2003/0110503 A1 | 6/2003 | Perkes | |
| 2003/0163810 A1* | 8/2003 | Iijima | G06Q 30/0277 |
| | | | 348/E7.071 |
| 2003/0189668 A1 | 10/2003 | Newnam et al. | |
| 2003/0192060 A1* | 10/2003 | Levy | H04N 5/783 |
| | | | 725/112 |
| 2004/0177063 A1 | 9/2004 | Weber et al. | |
| 2004/0197088 A1* | 10/2004 | Ferman | H04N 21/482 |
| | | | 348/E5.067 |
| 2004/0218894 A1* | 11/2004 | Harville | G06F 16/29 |
| | | | 386/241 |
| 2004/0221303 A1* | 11/2004 | Sie | H04N 21/4882 |
| | | | 725/28 |
| 2004/0237120 A1 | 11/2004 | Lewin et al. | |
| 2004/0261099 A1 | 12/2004 | Durden et al. | |
| 2004/0261136 A1 | 12/2004 | Aratani et al. | |
| 2005/0005308 A1* | 1/2005 | Logan | H04N 21/4782 |
| | | | 348/E7.071 |
| 2006/0233531 A1 | 10/2006 | Toyama et al. | |
| 2007/0198468 A1 | 8/2007 | Berger | |
| 2007/0260677 A1* | 11/2007 | DeMarco | H04N 21/8586 |
| | | | 709/203 |
| 2008/0077952 A1 | 3/2008 | St. Jean et al. | |
| 2008/0109844 A1* | 5/2008 | Baldeschwieler | H04N 21/222 |
| | | | 348/E7.071 |
| 2008/0170840 A1 | 7/2008 | Kaneko et al. | |
| 2008/0256572 A1* | 10/2008 | Chen | H04N 21/812 |
| | | | 725/32 |
| 2009/0106104 A1* | 4/2009 | Upendran | H04N 21/4314 |
| | | | 705/14.5 |
| 2009/0204243 A1 | 8/2009 | Marwaha et al. | |
| 2009/0217329 A1* | 8/2009 | Riedl | H04N 21/4788 |
| | | | 725/93 |
| 2009/0228920 A1 | 9/2009 | Tom et al. | |
| 2009/0252476 A1* | 10/2009 | Kimura | H04N 5/775 |
| | | | 340/5.83 |
| 2009/0271819 A1* | 10/2009 | Cansler | H04N 21/435 |
| | | | 725/34 |
| 2009/0292376 A1* | 11/2009 | Kazem | H04N 21/4668 |
| | | | 700/94 |
| 2009/0319925 A1 | 12/2009 | Katinsky et al. | |
| 2010/0077017 A1 | 3/2010 | Martinez et al. | |
| 2010/0125882 A1* | 5/2010 | Athias | H04N 21/812 |
| | | | 725/88 |
| 2010/0260468 A1 | 10/2010 | Khatib et al. | |
| 2010/0269030 A1 | 10/2010 | Dugonjic et al. | |
| 2010/0306197 A1 | 12/2010 | Jin et al. | |
| 2011/0276864 A1 | 11/2011 | Oules | |
| 2012/0066705 A1* | 3/2012 | Harada | H04N 21/42201 |
| | | | 725/12 |
| 2012/0079529 A1* | 3/2012 | Harris | H04N 21/84 |
| | | | 725/39 |
| 2012/0124618 A1 | 5/2012 | Ruiz-Velasco et al. | |
| 2012/0159542 A1* | 6/2012 | Minwalla | H04N 21/812 |
| | | | 725/36 |
| 2012/0198492 A1* | 8/2012 | Dhruv | H04N 21/8543 |
| | | | 725/32 |

(56) References Cited

U.S. PATENT DOCUMENTS

| | | | |
|---|---|---|---|
| 2012/0210379 A1* | 8/2012 | McCoy | H04N 21/64322 725/109 |
| 2012/0254365 A1* | 10/2012 | Adi | H04N 21/64322 709/219 |
| 2012/0265735 A1 | 10/2012 | McMillan et al. | |
| 2012/0284744 A1 | 11/2012 | Kumar | |
| 2013/0050418 A1* | 2/2013 | Nishioka | H04N 13/128 348/51 |
| 2013/0050440 A1* | 2/2013 | Kaseno | H04N 13/31 348/51 |
| 2013/0061262 A1 | 3/2013 | Briggs et al. | |
| 2013/0093762 A1* | 4/2013 | Sugiyama | H04N 13/398 345/419 |
| 2013/0097634 A1* | 4/2013 | Jin | G11B 27/28 725/34 |
| 2013/0124242 A1 | 5/2013 | Burke et al. | |
| 2013/0187927 A1 | 7/2013 | Weinmann | |
| 2013/0227038 A1 | 8/2013 | Rich | |
| 2013/0332971 A1* | 12/2013 | Fisher | H04N 21/8456 725/93 |
| 2014/0052770 A1* | 2/2014 | Gran | H04N 21/8586 709/203 |
| 2014/0082659 A1* | 3/2014 | Fife | H04N 21/812 725/32 |
| 2014/0089033 A1 | 3/2014 | Snodgrass | |
| 2014/0089966 A1 | 3/2014 | Briggs et al. | |
| 2014/0143440 A1* | 5/2014 | Ramamurthy | H04N 21/23439 709/231 |
| 2014/0164266 A1 | 6/2014 | Guzik | |
| 2014/0165120 A1 | 6/2014 | Losev et al. | |
| 2014/0282772 A1* | 9/2014 | Chen | H04N 21/42201 725/100 |
| 2015/0350736 A1* | 12/2015 | Chan | H04N 21/2365 725/93 |
| 2017/0171341 A1* | 6/2017 | Zane | H04N 21/23439 |

FOREIGN PATENT DOCUMENTS

| | | |
|---|---|---|
| EP | 1864229 | 12/2007 |
| WO | WO 2001/060060 | 8/2001 |

OTHER PUBLICATIONS

Concolato, et al., Live HTTP Streaming of Video and Subtitles within a Browser, Feb. 26-Mar. 1, 2013.

Drucker, et al., MediaBrowser: Reclaiming the Shoebox, Microsoft Research, May 25-28, 2004.

International Search Report and Written Opinion for Application No. PCT/US2013/070612, dated Mar. 13, 2014.

Johnson, Internet Multimedia Databases, 1998.

Madhwachararyula et al., Content Based Editing of Semantic Video Metadata, National University of Singapore.

Natu, et al., Digital Asset Management Using a Native XML Database Implementation, 2003.

Pea, et al., Video Workflow in the Learning Sciences: Prospects of Emerging Technologies for Augmenting Work Practices, pp. 427-460.

Sawarkar, Digital Asset Management, May 22, 2001.

Schroeter, et al., Annotating Relationships Between Multiple Mixed-media digital objects by extending Annotea, School of ITEE, The University of Queensland.

Van Rijsselbergen et al., On How metadata enables enriched file-based production workflows.

* cited by examiner

```
204  <?xml version="1.0" encoding="UTF-8"?>               202
     <!DOCTYPE workflow PUBLIC "-//c2u//DTDWORKFLOW1.0//EN" "http://
206  www.c2u.com/DTDs/workflow-1.0.dtd">
     <workflow-file>              208
210  <doctype> workflow</doctype>
     <version>2.0</version>       212
214  <metadata>
     <title> Swimming with Sea Lions </title>   216
218  <owner>John Steinberg </owner>
     <copyright> John Steinberg © 2012 </copyright>              220
222  <keywords>snorkeling, Patagonia, Argentina, sea lion</keywords>
     <advertising-code> a </advertising-code>   224
226  <exclusives>none </exclusives>
     <advertiser-account-number> xyz123 </advertiser-account-number>
     </metadata>           228
230
     <flow-control>   232
234  <launch-event>
     <event-value>0</event-value>              236
238  <event-position>00:00:00</event-position>
     <layer>0</layer>   240
242  </launch-event>
     <launch-event>                244
246  <event-value>1</event-value>
     <event-position>00:00:00</event-position>
250  <layer> </layer>          248
     </launch-event>   252
254  <launch-event>
     <event-value>2</event-value>              256
258  <event-position>00:17:06</event-position>
     <layer>1<layer>   260
262  </launch-event>
     <launch-event>                264
266  <event-value>3</event-value>
     <event-position>00:19:19</event-position>
270  <layer>0</layer>          268
     </launch-event>   272
     </flow-control>
274
     <event>                       276
278  <event-order>0</event-order>
     <mediatype>html</mediatype>                280
282  <uri>http://www.freevidtitles.com/NaLTa5dR/</uri>
     <media-inset>0</media-inset>
```

FIG. 2A

286 <media-outset>0:18:06</media-outset> 284
<volume> 288
290 <start-volume>0</start-volume>
<fadeup-start> 0:00:05</fadeup-start> 292
294 <fadeup-rate>35</fadeup-rate>
<end-volume>11</end-volume> 296
298 <fadedown-start>0.17.56</fadedown-start>
<fadedown-rate>2 </fadedown-rate>
302 <end-volume>0</end-volume> 300
</volume> 304
306 <enter>
<enter-effect> </enter-effect> 308
310 </enter>
<exit> 312
314 <exit-effect>fade</exit-effect>
<fadeout-start> 0:18:06</fadeout-start> 316
318 <fadeout-rate>8</fadeout-rate>
</exit> 320
322 <metadata>
<title> Swimming with sea lions: title sequence </title> 324
326 <owner>John Steinberg </owner>
<copyright> John Steinberg 2012 </copyright> 328
330 <keywords> 3D Perspective, Fadeout </keywords>
<advertising-code> x </advertising-code> 332
334 <exclusives> none </exclusives>
<advertiser-account-number> xyz123 </advertiser-account-number>
338 <length>0:20:00 </length> 336
<resolution>640</resolution> 340
342 <framerate>24</framerate>
<native-aspect>4:3</native-aspect> 344
346 <native-width> 5</native-width>
<native-height>3.375</nature-height> 348
350 <display-type>full</display-type>
</metadata>
</event> 352
354
<event> 356
358 <event-order>1</event-order>
<media-type>mp3<media-type> 360
362 <uri>http://www.c2u.com/userdata/rdmp/media/guitar/blue_tango_27/</uri>
<media-inset>0:03:10</media-inset> 364
366 <media-outset>03:12:00</media-outset>
<volume> 368
370 <start-volume>2</start-volume>
<fadeup-start>0:06:05</fadeup-start>
<fadeup-rate>4</fadeup-rate> 372

FIG. 2B

```
374
  <end-volume>8.5</end-volume>              376
378 <fadedown-start>0.55.22</fadedown-start>
  <fadedown-rate>2</fadedown-rate>          380
382 <end-volume>0</end-volume>
  </volume>                    384
386 <enter>
  <enter-effect> </enter-effect>
390 </enter>      388
  <exit>                           392
394 <exit-effect> </exist-effect>
  <fadeout-start> </fadeout-start>  396
398 <fadeout-rate> </fadeout-rate>
  </exit>            400
402 <metadata>
  <title>blue tango</title>     404
406 <owner>art muir</owner>
  <copyright>reactionary death metal publishing ©2009 </copyright>  408
410 <keywords>guitar, acoustic, tango</keywords>
  <advertising-code> b </advertising-code>   412
414 <exclusives>none </exclusives>
  <advertiser-account-number> wvu456 </advertiser-account-number>
418 <length>3:12:00</length>      416
  <bit-rate> 128 </bit-rate>    420
422 <bit-depth>16</bit-depth>
  <sample-rate>44.100</sample-rate>
426 </metadata>    424
  </event>
              428
430 <event>
  <event-order>2</event-order>   432
434 <mediatype>FLV</mediatype>
  <uri> http://www.videocontent.com/CwKYa3cY/ </uri>
438 <media-inset>0:00:00</media-inset>  436
  <media-outset>0:02:23</media-outset>
442 <volume>                      440
  <start-volume>8</start-volume>
446 <fadeup-start></fadeup-start>
  <fadeup-rate> </fadeup-rate>   448  444
450 <end-volume>8</end-volume>
  <fadedown-start>0.02.00</fadedown-start>
454 <fadedown-rate>6</fadedown-rate>
  <end-volume>0</end-volume>           452
```

FIG. 2C

```
                        456
458  </volume>
  <enter>                           460
462  <enter-effect> wipe left</enter-effect>
  <wipe-rate>3</wipe-rate>
466  </enter>     464
  <exit>                            468
470  <exit-effect>fadeout</exit-effect>
  <wf-fadeout-start>0:1:54:04</wf-fadeout-start>
474  <fadeout-rate>5</fadeout-rate>
  <end-density>0</end-density>              472
478  </exit>     476
  <metadata>              480
482  <length> 2:23 </length>
  <title> Sea Lion Pup </title>       484
486  <resolution>640 x 480 </resolution>
  <framerate>30 </framerate>        488
490  <aspect-ratio> 4:3 </aspect-ratio>
  <width> 5 </width>        492
494  <height> 3.755 </height>
  </metadata>
  </event>     496
498
  </workflow-file>
```

FIG. 2D

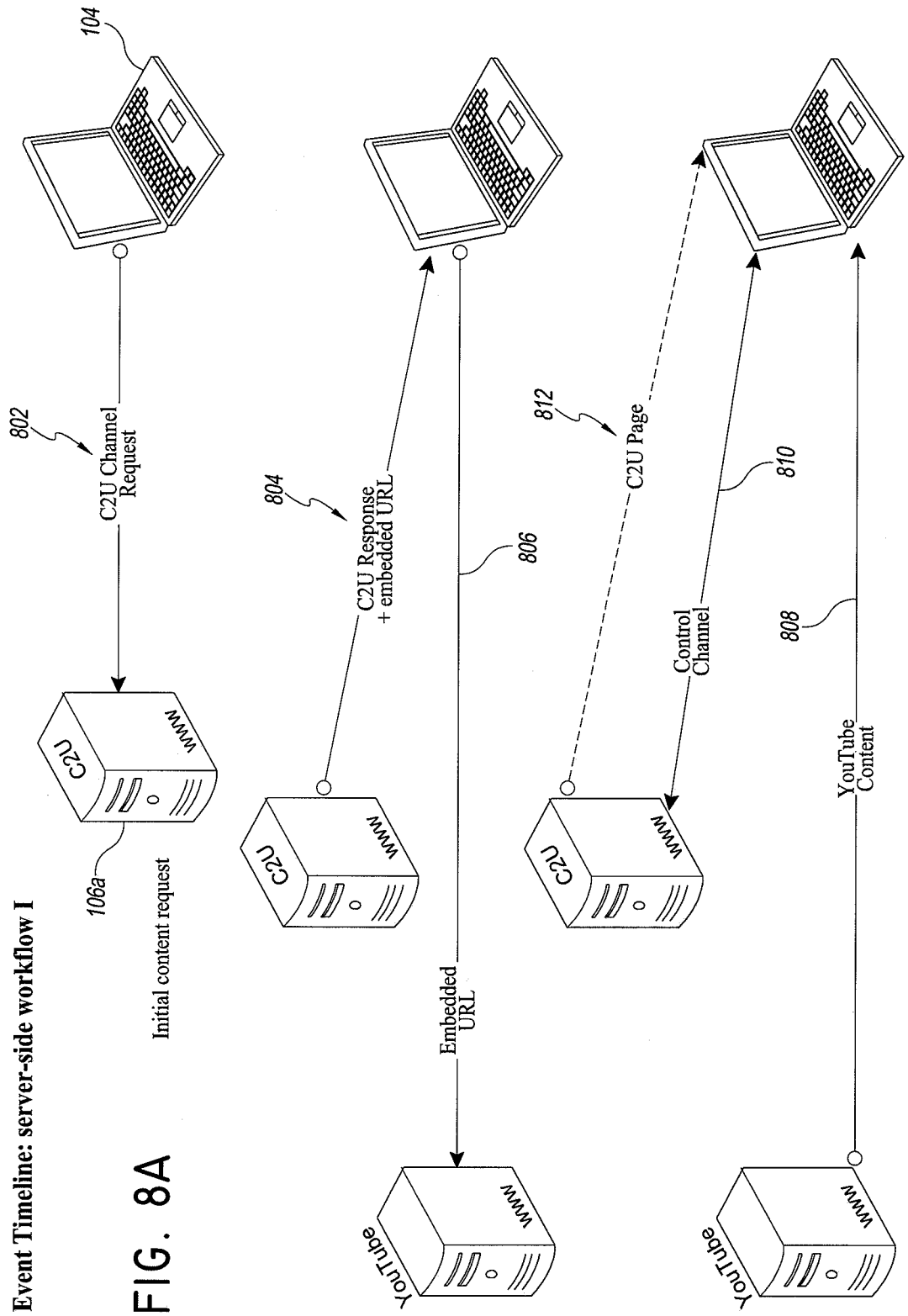

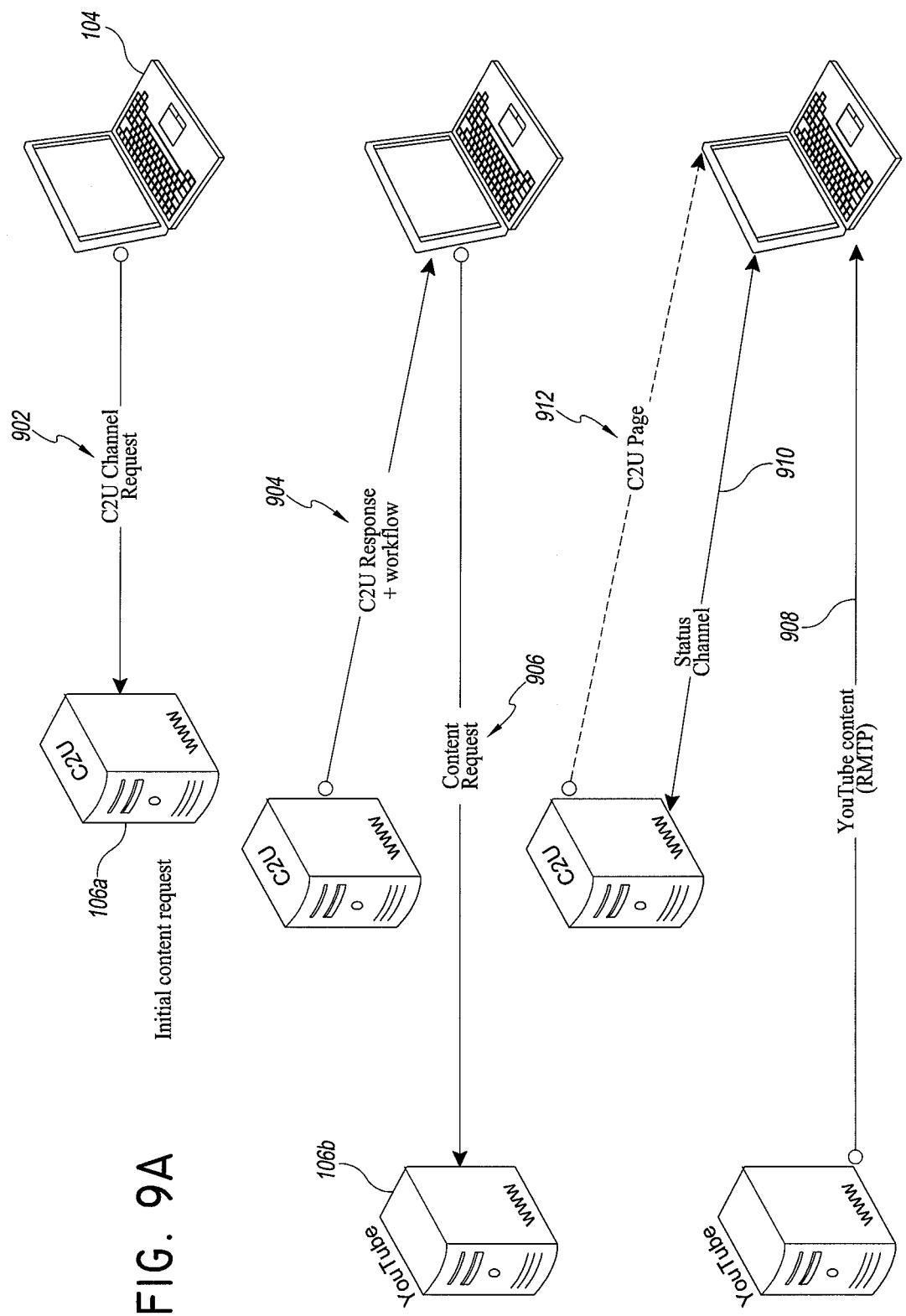

SYSTEM AND METHOD FOR CREATING CUSTOMIZED, MULTI-PLATFORM VIDEO PROGRAMMING

RELATED APPLICATIONS

Any and all applications for which a foreign or domestic priority claim is identified in the Application Data Sheet, or any correction thereto, are hereby incorporated by reference into this application under 37 CFR 1.57.

BACKGROUND

Television has been the dominant mass media for roughly half a century. Initially, it represented a huge advance over the prior dominant form of home media—radio—because it offered video to accompany the audio offered by radio. It quickly became not just a substitute for radio, but also stiff competition for going to a movie theater, the prior means for consuming video content.

Early televisions received content via radio frequency transmissions—indeed, the initial VHF band used for broadcast television bracketed the spectrum allocated for FM radio. Most televisions marketed in the U.S. during the broadcast era could receive only 12 VHF channels, making spectrum a scarce and valuable commodity. Major media companies quickly came to dominate the new media, and network executives came to hold the power to decide what programs their stations would carry and thus, that people could watch. In order to maximize advertising revenue, those executives tended to choose programs that would appeal to the largest possible audience. It became extremely difficult to find niche programming on the public airwaves.

The technology used to distribute programming has changed since the 1950s, but those dynamics continue to dominate television today. With the advent of non-broadcast distribution of programming (primarily via cable, but also more recently via fiber optic) the number of channels available to the public has expanded significantly, which enables such specialization as cooking channels, sports channels, etc., but it remains the case that television programming is chosen and created by a relatively small number of program creators, all of whom are seeking the largest possible audiences, and choose content accordingly.

Network programmers have a few structural advantages that have maintained their hold on the viewing time of their audiences: virtually every home in America has at least one television, and many homes have more. Television viewing is also abetted by one of the distinguishing characteristics of most broadcast media: it is always on. TV programmers go to great lengths to avoid gaps in programming (also known as dead air). A program is always followed by another program (or, of course, a revenue-producing commercial). And so, following a sort of Newtonian physics, a TV, once on, tends to remain on. This is almost certainly a factor in the 4-5 hours of TV that are still watched in American households today.

Starting in the last few years of the 20th century, television began to face a growing challenge for viewing time from another technology—the Internet. Fairly early in its evolution (a) some of the traditional providers of video content in the form of movies and television saw value in offering at least some of their existing content online, while (b) others saw the Internet as a grave competitive threat to their continued existence. Large corporate content owners were capable of offering web-enabled video, and of promoting and hosting that video so that consumers could find and access it. But ordinary consumers found it extremely difficult to offer up original content of their own. Thus at first, the bulk of content available online came from a few large providers, so that video content online largely mirrored the situation on television: content was created by the few to be watched by the many.

That paradigm shifted dramatically after the launch of YouTube in 2005. YouTube provided an easy way for ordinary consumers to upload video content and make it available to anyone who wished to view it. The amount of user-generated content available online exploded; careers were launched via user-created content that largely bypassed the gatekeeper function of the traditional media.

According to data published by market research company comScore, YouTube is the dominant provider of online video in the United States, with a market share of around 43 percent and more than 14 billion videos viewed in May 2010. YouTube says that roughly 60 hours of new videos are uploaded to the site every minute, and that around three quarters of the material comes from outside the U.S. The site has eight hundred million unique users a month. It is estimated that in 2007 YouTube consumed as much bandwidth as the entire Internet in 2000. Alexa ranks YouTube as the third most visited website on the Internet, behind Google and Facebook.

Other sites have attempted to duplicate this success, and offer hosting of user-created video content. These include VEVO, hulu, Metacafe, Vimeo, and others. And the overall segment has grown tremendously. Despite this remarkable growth, there are important characteristics of current solutions for offering user-created content that limit its potential. Perhaps the most important attribute of television is its momentum: the ways in which the inherent characteristics of a curated, always-on media encourages consumers to keep consuming. Yet current tools for hosting video content online offer very little forward momentum. In general, users, search for and find a video, watch the video, and then the action stops: most hosting sites offer up suggestions for what to watch next, but unless the viewer chooses another video to watch, nothing happens. Recently there have been attempts to create "channels", which consist of a stack of videos from a single source, which play on after the other. But the experience these "channels" offer remains very different from that of watching television.

The fact that watching user create video online is such a discontinuous experience is likely a major reason why, according to Wikipedia, visitors to YouTube spend an average of fifteen minutes a day on the site, in contrast to the four or five hours a day spent by a typical U.S. citizen watching television.

Traditional television offers a passive, prepackaged experience—turn it on, and it just runs . . . continuously. Delivering an Internet-based experience that achieves this characteristic of broadcast media for the viewer would likely drive large increases in viewing time for many viewers. On the other hand, if the Internet viewing experience merely duplicates the content already available on traditional broadcast television there may not be much point in the effort. But the essence of the often-discussed "long tail" phenomenon is the idea that while the audience for a specific niche interest may be small, there are so many niche opportunities that the aggregate opportunity is large.

Thus there is a need for a system that enables the creation of Internet-based sources of video programming that give consumers convenient always-on programming.

Another shortcoming of the current approach to online video is that it while it is easy to upload video from a digital video camera (which today can be as ubiquitous a device as a smart phone or inexpensive point-and-shoot camera), it is a substantial step further for most users to create professional-looking video content. The problem is not merely a question of the resolution and production quality of the raw video footage itself, which is quickly being solved by rapid improvements in camera technology even at the lower end of the market; in fact many cellular phones can now record not just high-quality still photographs, but even good to high quality video. Professional video programming as seen on television does not consist of raw video footage; it generally includes computer-generated titles, artful transitioning between segments, voice-overs, "pan & zoom" movement over still images (widely known as the "Ken Burns effect"), and many other techniques. Consumers still find it challenging to engage in video editing, compositing etc. on their own content, and find it virtually impossible to do so with content sourced from elsewhere on the Internet. It would thus be advantageous to provide a service that could enable consumers to apply such techniques to video footage regardless of the source or location of such footage.

A highly dynamic form of user-created Internet content is web logging, or blogging. Blogging began in the late 1990s. At its simplest, a blog is simply a series of text entries, arranged in reverse chronological order and viewable through a web browser. Blogs have evolved into several subspecies, including personal diaries, and sites that comment on, analyze and even break major news stories. An essential aspect of the blogging form is its interconnectedness, both with the larger media environment and among blogs themselves. Prior to blogs, consumers could read news stories in major newspapers, but the interpretation of those stories was a highly fragmented and difficult process. The feedback loop between readers and writers, to the extent there was one, involved letters to the editors, which could be ignored, and at best were usually published long after the underlying story had receded in the public consciousness. With blogs, a news story could be quoted, challenged, dissected and refuted within hours or minutes by one blogger, and other bloggers could further comment and analyze, and bring the flaws in mainstream coverage to a level of prominence that could often compete with the visibility of the original story itself. Major news organs now find themselves pressured to respond and sometimes change stories as swarms of "non-professional" journalists elbow their way into prominence.

Initially, blogging was primarily a non-commercial undertaking. But as blogging evolved and the audience for blogging grew, it became clear that that the creators and/or owners of popular blogs could monetize their audiences by selling display advertising on blog pages in much the same way that broadcast and print content providers had historically used. New approaches to selling and displaying such advertising rapidly evolved. Among the more successful approaches is the Google AdWords/AdSense system.

Adwords/Adsense creates a market for advertisers and "digital sign space owners"—i.e., websites with viewers—that is easy for both parties to use and is efficient in matching these two parties.

The AdWords user is typically a business (the advertiser) that wishes to advertise a product or service and agrees to pay some amount to the ad syndicator (Google). The ad syndicator in turn pays the owner of a web page to display the advertiser's ad via Adsense. The web page host is typically a content or online service provider with content or services that will attract potential ad viewers to the page. Each time a visitor to the page clicks on that ad, the advertiser incurs a fee, which is paid to the syndicator and in turn shared with the page owner. This approach is generally known as "pay per click"; some advertising is paid on a "per view" basis; still other advertising is paid if a consumer actually purchases the advertised good.

The corresponding AdSense user is typically a web-based content or service provider (blogger, eCommerce site, news site, entertainment site, etc) who is interested in generating ad revenue and is willing to sell some of the web site's page space to the ad syndicator (Google) in much the same way a physical billboard owner gets paid to rent billboard space to advertisers. The syndicator pays the page owner whenever a viewer clicks on an ad that the syndicator has inserted into the page.

The system is sophisticated in that it is capable of parsing and analyzing the content of the website that hosts each ad in order to match advertisers with the most appropriate potential customers. Some advertising syndication services go further and use information not just about the site hosting the ad, but also about the individual person viewing it. By accessing the information modern browsers usually collect, advertising syndicators can use browsing history, search engine queries and other user-specific data to serve up highly targeted ads, thereby maximizing the effectiveness of those ads, and thus maximizing the revenue generated for all parties.

The existence of such sophisticated but transparent tools has made it possible to generate significant revenue with "long tail" content: 1000 blog posts generating 1000 page views each may generate as much revenue as a single article that generates 1 million views. Evidence of the economic value of such business models was given when Huffingtonpost.com, an aggregation of news and political blogs, was sold to AOL in 2011 for $315M.

Additional shortcomings of the existing technologies used for the distribution of video programming flow from inherent characteristics inherited from the roots of broadcasting. When radio towers began transmitting programming almost 100 years ago, and advertising became the preferred means for underwriting and profiting from that process, advertisers selected radio stations that covered the geographic area that best matched the locations of their stores or businesses. If a radio station's signal reached only listeners who had no way to purchase their products, or who spoke a different language or were culturally dissimilar from the demographic the advertiser wanted to reach, that advertiser would not buy advertising on that station. Because advertising considerations quickly came to dominate decision-making in radio (and television a few decades later), when technology made it possible to re-transmit programs beyond their original geography, broadcasters began to jealously guard the right to do so.

Similarly, at the dawn of broadcasting, programs were essentially real-time-only: it was extremely difficult to record and replay radio and television content in order to permit asynchronous consumption. Audio and video recording technologies have now evolved to the point where infinitely flexible timeshifting is possible. However, the science behind targeted programming has also evolved. Broadcasters believe that the viewing audience is different at 7 AM than at 7 PM, and carefully match programming and advertising to the specific audience that they expect to be watching a specific show at a specific time. Ads are keyed to the context in other ways as well, based on seasons, current events and other factors. If a consumer records a program and watches it a day or a week after it was intended to be viewed, the value of the ad may be sharply reduced, even if the ad is viewed.

Traditional broadcasting had another significant limitation related to advertising that dates to the dawn of radio. When a radio or television program is distributed by radio waves emanating from one tower for a whole city, all of the listeners/viewers will not only see exactly the same program, they will also be exposed to exactly the same commercials. A broadcaster may be fully aware that 10% of its audience is composed of teetotalers, but the broadcaster and its beer-selling advertiser may well push out beer ads regardless, because a broadcast signal, by definition, cannot be customized to the characteristics of each individual audience member.

Finally increasingly sophisticated recording systems have given consumers an ability particularly reviled by broadcasters—the ability to fast-forward past or otherwise skip commercials. This cuts to the very heart of the broadcast paradigm. Some recent digital video recorders have bowed to broadcaster pressure and limited the ability of users to skip commercials, but these efforts are likely to face stiff resistance in the market because consumers have already "tasted the forbidden fruit." A tense stand-off between consumers accustomed to "free" content and broadcasters increasingly worried about the loss of the revenue that made that free content possible is the result.

For all of these reasons, broadcasters have been very reluctant to enable viewing of broadcast content that diverges from the 100-year-old model: they generally resist business models that permit consumers to decide when to watch programs even by those within the geographic target market, and they tend to make it especially difficult to consume their content outside the target markets.

The latter problem is particularly acute for ex-patriot populations. Large immigrant populations (e.g., Chinese immigrants to the United States) have real interest in viewing Chinese-language content, but opportunities to do so may be extremely limited unless a sufficiently large population concentrates in a single market to interest a profit-driven provider such as cable operator. With existing technology, the required number of viewers is likely to be large, because the effort involved in repurposing content for a new market is considerable. First, contracts need to be created between the originating broadcaster (and perhaps the owners of individual programs) and the reselling cable operator. Second, in order to optimize the advertising for the new audience, the original ads will likely have to be replaced in the feed with ads targeted to the audience in the new market: a restaurant in Shanghai is unlikely to be willing to pay a Chicago cable operator to expose her ad to Illinois viewers. This process likely requires that an entire sales operation be created, new ads produced, etc.

It would be advantageous if a content delivery system gave broadcasters a simple method by which to offer video programming that preserved the ability to monetize advertising that is optimized to different target audiences regardless of when and where the programming is viewed, and that ensured that the consumer could not avoid viewing the advertising that pays for such content.

Another limitation of traditional broadcasting is that, although a TV broadcast can reach millions of TVs, it generally cannot reach devices other than TVs. Twenty years ago that was not a significant limitation. Today people have access to a variety of devices that can be used to consume video and/or audio content—smart phones, tablet computers, personal computers, etc. Unless a broadcaster has taken steps to make the content available by means other than broadcasting, bringing the content to these other devices still requires considerable work by the individual consumer, and the broadcaster realizes little benefit from such porting.

Another trend affecting the ways in which people watch video content is the convergence of television and the Internet. The analog televisions that were all that was available until recently could be connected to computers with some difficulty. Newer digital televisions are essentially computer monitors, and some of the newest televisions are in effect computers themselves that are designed to connect directly to the Internet and can easily access some forms of online content even if no separate personal computer is connected to them. Some new TVs can access content sourced from the Internet as easily as they can access content from broadcast sources. Thus the stage is set for the elimination of the traditional dichotomy between web and TV content. It is becoming possible for viewers to seamlessly move from traditional broadcast content to user-created content and back again.

It would also be useful if a content delivery system permitted content owners to deliver and monetize various forms of programming, including but not limited to the programs currently available primarily via broadcast, to a range of devices with "unskippable" advertising content that is personalized for specific consumers.

It would also be extremely useful if a tool existed that would enable non-professionals to create video programming that performs tasks with video content—annotate, edit, composite, etc.—that are analogous to the tasks blogging software can perform for text, and easily post such content online.

It would also be advantageous if users could easily create advertising slots within video content, and allow other service providers, such as a hosting service or syndicator, to fill those slots with ads targeted to each individual viewer based upon characteristics such as the specific content being viewed, the browsing and demographic data known about that user, etc., and to share the advertising revenue with that program creator.

It would also be advantageous if users could edit together content consisting of a variety of video content forms—videos found on the Internet, self-generated content, etc.—and assemble such content in longer-form programming analogous to television shows, and in turn assemble multiple shows from various sources into longer form collections analogous to how a TV network programs hours of individual shows into continuous programming. And it would be advantageous for users to be able to assemble such programming for themselves and offer it to others, so that users could select a "network" and see a continuous stream of content, selected not by a limited number of corporate networks, but by a potentially infinite number of user/creators.

SUMMARY

Certain embodiments of this invention relates to the creation and consumption of media files, which may comprise video, audio, or both. More specifically, one or more embodiments pertains to an approach to using a system of tags organized into a workflow to represent how multiple media files that may be located in a plurality of locations are to be combined and displayed for a viewer of the specified combination of files. It further pertains to how the multiple media files are to be played back as described in the workflow.

In other embodiments, the systems and methods pertain to how the media files are to be combined with advertising as described in the workflow. It further pertains to how the media files can be assembled into a logical hierarchy including both smaller and larger assemblies of files as described in the workflow. It further pertains to how the files can be continuously streamed in ways that will be optimized for individual viewers.

In one embodiment, a method creates video and audio content to be subsequently viewed over a network. The method comprises representing source identifiers of one or more media files accessed over the network as uniform resource indicators corresponding to the location of the media files on the network. Further, the method comprises represents timing aspects of at least one the media file, including the portions that are and are not to be presented as part the subsequent playback, as at least strings of characters comprising a system of tags and at least numerical values indicating at least the point within the media file at which playback is to begin and the point within the media file at which playback is to end.

In addition the method comprises representing at least a transitional aspect of how a plurality of the media files are to be presented, such as a fade-in or a fade-out, as at least a string of characters comprising a system of tags and at least an alphanumeric value indicating at least a parameter describing the transitional effect to be presented. Moreover the method comprises representing at least a textual aspect of the video content, such as a title or subtitle, as at least a string of characters comprising a system of tags and numerical values indicating at least the type of textual element to be presented and the point within the media file at which presentation of the textual aspect is to begin and the point within the media file when presentation of the textual element is to end;

The method also creates a master file containing all of the representations relating to the video and audio content and assigns a uniform resource indicator to the master file. Still further, the method comprises storing the file on a computer attached to the network, and making the file accessible over the network by one or more viewers of the content.

In another embodiment, the media files are located on a plurality of servers, the tags are in XML format, and/or the network is the Internet. In another aspect, the master file is created on a personal computer, the master file is created on a smart phone, or the master file is created on a tablet computer.

In yet other embodiments, the representation of the transitional aspects includes specification of z-layer values for a plurality of the media files, where the z-layer values determine whether one of the media files should appear in front of another of the media files.

In still other embodiments, the viewers of the content view the content on a television, or view the content on a mobile device.

In a different embodiment, a system creates video and audio content to be subsequently viewed over a network. The system comprising an application running on a first device comprising computer hardware, wherein the device is in communication with a network. The application represents the source identifiers of one or more media files accessed over the network as uniform resource indicators corresponding to the location of the media files on the network. The application also represents timing aspects of at least one the media file, including the portions that are and are not to be presented as part the subsequent playback, as at least strings of characters comprising a system of tags and at least numerical values indicating at least the point within the media file at which playback is to begin and the point within the media file at which playback is to end.

Furthermore, the application represents at least a transitional aspect of how a plurality of the media files are to be presented, such as a fade-in or a fade-out, as at least a string of characters comprising a system of tags and at least an alphanumeric value indicating at least a parameter describing the transitional effect to be presented. In addition, the application represents at least a textual aspect of the video content, such as a title or subtitle, as at least a string of characters comprising a system of tags and numerical values indicating at least the type of textual element to be presented and the point within the media file at which presentation of the textual aspect is to begin and the point within the media file when presentation of the textual element is to end.

The application also creates a master file containing all of the representations relating to the video and audio content, assigns a uniform resource indicator to the master file, stores the file on one or more computers attached to the network, and makes the file accessible over the network by one or more viewers of the content.

In other embodiments, the media files are located on a plurality of servers, the tags are in XML format, and/or the network is the Internet. Furthermore, the master file is created on a personal computer, a smart phone, or a tablet computer.

In certain embodiments, the representation of the transitional aspects includes specification of z-layer values for a plurality of the media files, where the z-layer values determine whether one of the media files should appear in front of another of the media files. The viewers can view the content on a television or a mobile device.

BRIEF DESCRIPTION OF THE DRAWINGS

FIGS. 2a, 2b, 2c, and 2d show an example of a workflow according to an embodiment of the invention.

FIGS. 8a and 8b show an alternative method of visualizing one example of how content created using an embodiment of the invention can be played back.

FIGS. 9a and 9b show an alternative method of visualizing a different example of how content created using an aspect of the subject invention can be played back.

DETAILED DESCRIPTION

Figure 1:
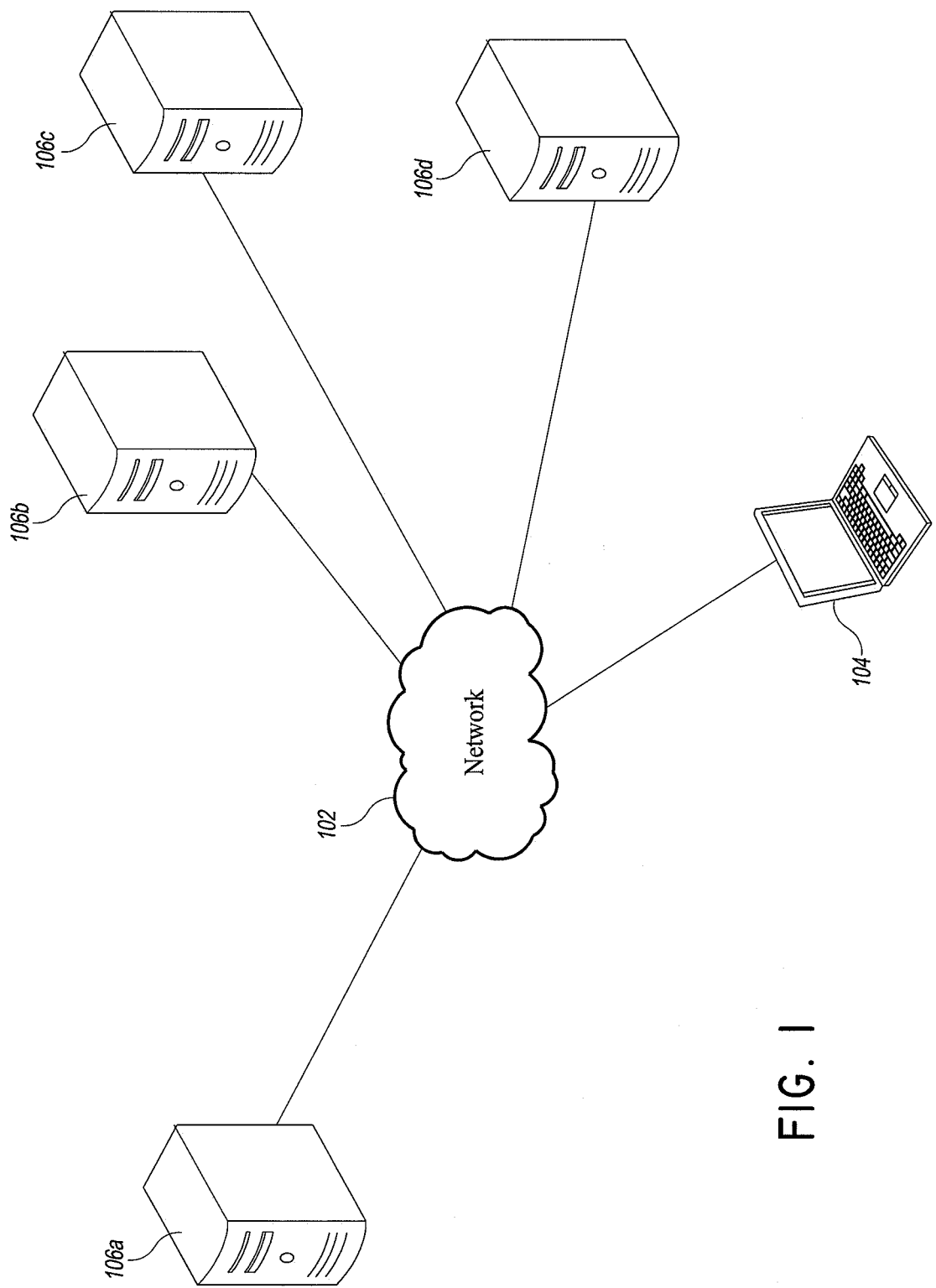
FIG. 1 shows an example of an overall environment in which an embodiment of the invention may be used.

One or more embodiments of the invention comprises a system of tools and services that allow precise, controlled sequencing of content from multiple content sources across a network for delivery to a consumer or consumers. In one embodiment, this is accomplished in part through the creation and editing of both content files, which generally consist of source audio and video content, as well as workflow files, which determine how different source files and processing commands are executed, combined, etc. In one embodiment, the system also includes processes for the storage and delivery of content and workflow files, as well as resources sufficient to warehouse such files. In one embodiment, the invention also includes tools that assist in the discovery of collections of workflow files that are "consumed" in the form of individual shows and channels.

One aspect of the invention allows content aggregators to upload and enable the playback of content hosted on the site's servers, typically to be referred to by one or more workflow files.

Another aspect of the invention creates a workflow that contains the locations (uniform resource identifier, or URI) of content resources, metadata related to these content resources (e.g., file length, format, codec, resolution, etc.) as well as additional metadata elements created by the subject invention that identify particular components of or locations within the structure of the resource (e.g., timing points within a resource file, buffering information, etc.). The workflow file can contain metadata for multiple resources at the same or different network locations as well as local and remote actions to be performed during the playback of a specific content source.

Another aspect of the invention is an editing tool that lets a content aggregator record one or more events, descriptions of which are to be stored within the workflow file to be executed at a given time, typically relative to a location within a content stream or streams of a given URI. The editing tool lets the user scrub through (jump to different points in) the video file at the speed of the users choice, as well as stop, rewind and advance as needed. The tool allows content aggregators to record points in the workflow file where specific events the aggregator chooses will be executed in a coordinated fashion during playback of the content file. Having a local file, or the caching proxy discussed below would enhance the scrubbing and editing capabilities, without one or the other, the quality of scrubbing will be dictated by the limitations of the interface exposed by the online media provider.

An event can be an action such as an effect, a URL request, a local action, etc. Effects can include but are not limited to, annotations, transitions, and the starting, stopping or alteration of video or audio content that are interspersed with or overlaid onto content being delivered to a consumer's system.

Events can be timed to execute before, during or after the playback of a given piece of content, or at specified intervals within a given piece of content, allowing the content aggregator to make transitions between the playback of different content files, overlay effects onto content files being played, etc.

Overlay effects of this sort can be achieved using various methods depending on the technology used to record and display the media content. One such technology is commonly known as Flash, currently owned by Adobe Systems. As Flash video content is currently the most prevalent video streaming technology, one embodiment of the subject invention uses the techniques described herein to create effects such as annotations with Flash video as source material. Such content may be presented by creating and delivering to the client playback device a file generally known as an SWF file. Web-based media content can be described in a SWF file by embedding the URL of a Flash file into a parent container object such as an iFrame (an HTML technique used to display one item of content within a frame inside one or more other forms of content on the same page) and passing to the object the appropriate parameters so that the browser can display content on top of the Flash (SWF) object. For example, a CSS (Cascading Style Sheet, a page description language used to describe the presentation schematics of a document written in a markup language) div tag (another HTML technique used to group elements within a given page) can be used to position the overlay content by instructing the browser to display the overlay content in front of the content playing in the media container. This may be accomplished, for example, by using an attribute in CSS called z layer, which specifies the stack order of an element—that is, whether it appears in front of or behind other elements. By setting an object's CSS z-index property it is possible to position the object on a display plane (display planes are parallel to the screen—i.e. normal to the axis of viewing) with an absolute or a relative position reference in front of the Flash object. The overlaid content can be displayed using a combination of browser presentation and content commands, typically in the form of CSS and HTML, executed directly or through a scripting interface such as PHP, Ruby, etc. Overlay can be enabled either by the media container such as an SWF file or the presentation technology, such as CSS or HTML 5.0 by, e.g. setting a transparent background and placing the object on the correct layer using the z-index property.

In one embodiment, the consumer accesses the subject invention by invoking a web browser, directing the web browser to the URL of a program he wishes to view. When that URL is called, the server retrieves the workflow file for that program. That workflow file contains metadata describing a specific content sequence. The server employing the subject invention then manages playback of the content sequence as specified in the workflow file so that the requested program is played for the requesting consumer.

In one embodiment, upon receiving the consumers request to execute a workflow file, the server employing the subject invention begins executing the workflow file and responds to the consumer's request with content, including one or more URLs that point to remote media content. The embodiment then monitors the status of retrieval and playback of those URLs on the user's browser through status updates from the browser or other playback software. At a time determined by information contained within the workflow file or checkpoints based on the status of playback, the subject invention then sends new page content, which may be one or more URLs, to the user's browser, causing it to load the content in order to present the consumer with the appropriate network resource within the timeframe specified in the workflow file.

In short, in the server-based workflow, the server reads the workflow file and creates a web page that contains the URLs of the content. The server sends the page to the user's browser, which parses the HTML page and then fetches any remote resources required (i.e., it requests the URLs). The server gets playback status updates sent up to it from the browser, and at the appropriate time sends anew URLs to the browser to be fetched and displayed.

The consumer experiences a stream of content from remote URLs as well as actions and content from the server operated according to the subject invention, viewed on multimedia devices such as Internet-enabled televisions. In alternative embodiments, content created and/or managed with the subject invention may be viewed via a browser-like application on a device such as a tablet computer, desktop computer or mobile device such as a smart phone or other device used to access media.

FIG. 1 shows an example of an overall environment 100 in which an embodiment of the invention may be used. The environment 100 includes an interactive communication network 102 with computers 104 connected thereto. Also connected to network 102 are one or more server computers 106, which store information and make the information available to computers 104. The network 102 allows communication between and among the computers 104 and 106.

Presently preferred network 102 comprises a collection of interconnected public and/or private networks that are linked to together by a set of standard protocols to form a distributed network. While network 102 is intended to refer to what is now commonly referred to as the Internet, it is also intended to encompass variations which may be made in the future, including changes and additions to existing standard protocols.

In one embodiment, when a user of the subject invention wishes to access information on network 102, the user initiates connection from his computer 104. For example, the user invokes a browser, which executes on computer 104. The browser, in turn, establishes a communication link with network 102. Once connected to network 102, the user can direct the browser to access information on server 106.

One popular part of the Internet is the World Wide Web. The World Wide Web contains a large number of computers 104 and servers 106, which store files and documents in many forms including HyperText Markup Language (HTML) documents capable of displaying graphical and textual information. HTML is a standard coding convention and set of codes for attaching presentation and linking attributes to informational content within documents. Other forms include documents in the Real Time Messaging Protocol (RTMP). While certain embodiments of the invention described herein is intended to work with these existing messaging and document forms, it is also intended to encompass variations, which may be made in the future, including changes or additions to existing standard protocols.

The servers 106 that provide offerings on the World Wide Web are typically called websites. A website is often defined by an Internet address that has an associated electronic page. Generally, an electronic page is a document that organizes the presentation of text graphical images, audio and video.

In addition to the Internet, the network 102 can comprise a wide variety of interactive communication media. For example, network 102 can include local area networks, interactive television networks, telephone networks, wireless data systems, two-way cable systems, and the like.

In one embodiment, computers 104 and servers 106 are conventional computers that are equipped with communications hardware such as modem or a wired or wireless network interface card. The computers include processors such as those sold by Intel and AMD. Other processors may also be used, including general-purpose processors, multi-chip processors, embedded processors and the like.

Computers 104 can also be handheld and wireless devices such as personal digital assistants (PDAs), cellular telephones, tablets, smart phones and other devices capable of accessing the network. Computers 104 can also be devices such as Internet-enabled televisions, or televisions that have been connected to components that obtain content from the Internet and convert that content into images capable of display on a television, and that can transmit information back over the Internet, such as URLs, cookies and/or rich content such as video from a video camera.

Computers 104 may utilize a browser configured to interact with the World Wide Web. Such browsers may include Google Chrome, Microsoft Explorer, Mozilla, Firefox, Opera or Safari. They may also include browsers or other programs used on handheld and wireless devices to retrieve and display media content, or programs specifically adapted to viewing Internet content on televisions.

The storage medium may comprise any method of storing information. It may comprise random access memory (RAM), electronically erasable programmable read only memory (EEPROM), read only memory (ROM), hard disk, floppy disk, CD-ROM, optical memory, or other method of storing data.

Computers 104 and 106 may use an operating system such as Microsoft Windows, Apple Mac OS, Linux, Unix or the like.

Computers 106 may include a range of devices that provide information, sound, graphics and text, and may use a variety of operating systems and software optimized for distribution of content via networks.

One aspect of the subject invention enables the creation of a video or audio program. As previously described, a program consists of multiple components of content that can be played back in a manner specified by a workflow on a playback device such as a TV or computer. In the presently preferred embodiment, it is not necessary that all of the content that comprises a given program be stored on the servers operated by those practicing the subject invention. Rather, the subject invention can be used to coordinate the delivery of content from multiple servers connected to the network 102. The instruction set that determines which content is to be presented and how and when to present it is the workflow. An example of a workflow is shown in FIG. 2.

The workflow uses XML-like conventions to describe constituent elements; however, alternative approaches could also be employed. The first section of the workflow file contains top-level metadata about the workflow file. The metadata includes element 202, which identifies the workflow as an XML document and signals the browser or other program that will parse the file that it is encoded using (in this instance) UTF-8, the predominant character set for web applications. Item 204 identifies the file as a workflow and references the external library that in effect contains the rule book that the receiving application may use to understand how to interpret the workflow file. Item 206 signals the beginning of the workflow file. Item 208 uses the "doctype" attribute to signal to the application that the file is a workflow document. Item 210 signals the version of the workflow file to the application. Item 212 signals that the information that follows the metadata tag will be metadata about the workflow. Item 214 presents the title of the program represented by the workflow. Item 216 presents the name of the owner of the program represented by the workflow, while item 218 presents applicable copyright information. Item 220 presents keywords relevant to the program, which may be used by search engines in order to help users find the program. Items 222 through 226 disclose the preferences of the content creator regarding how advertising can and cannot be added to the content, etc., as well as identifying information to facilitate the process of compensating the file creator for the advertising that is inserted into the program. In one embodiment of the invention, this advertising-related information would be interpreted by an advertising workflow engine, such as Google Adwords for Video. Advertising engines attempt to create a market that brings advertising content to consumers. Metadata regarding the video content playing and the demographic, viewing and other preferences about the viewer can be used to match up advertising that is determined to be the most appropriate for a specific viewer. The advertising workflow engine may interface between a 3rd-party advertising syndicator and the workflow file. In another embodiment, the advertising-related information in the workflow file would be used directly to control the actions of the ad syndicator. This data may be used to, e.g., prevent unauthorized channels from showing content that is exclusive to one or more other channels, enable payment methods that depend on the number of times content is viewed (either overall number of impressions or relative to a given consumer), enable geographic or chronological restrictions on where and when content may be viewed, etc. Item 228 signals that the metadata section of the top-level workflow file is complete.

Maintaining proper timing when combining media assets from multiple sources, and when applying effects to those assets is challenging. Some cues will relate only to timing relative to a single asset. These cues will generally affect how the client computer 104 plays back that individual file, and will include changes like adjusting volume of audio, fade-in and fade-outs of individual video assets, "Ken Burns" effects, etc. But in order to make playback as much like professionally created media programming as possible, it is also necessary to control how individual assets will be transitioned, overlaid, etc. These kinds of effects require that there be a way to specify timing of one event relative to another.

Individual aspects of the workflow, including individual media files, may be thought of as separate events. One of the essential functions of the workflow file is to go beyond merely listing individual events, but tightly describing the relationship between those elements. The primary variables that must be specified for each event are the identifier for the specific element to be retrieved and played, and the synchronization data necessary to locate the event in the workflow relative to other elements One way of handling the coordination of the different timing elements is to present all of the inter-event timing instructions in the workflow together, while presenting intra-event cues separately within the instruction set for each individual event. Thus item 230 signals the beginning of the flow control section of the workflow file, which presents the timing relationships between each of the events that make up the workflow. The application executing these instructions may be a browser, or may be a translation application that converts workflow instructions into a format that is more easily executed by native applications or browsers on the viewing device. Item 232 initiates the launch instructions for a particular event; item 234 discloses that launch refers to event 0. Item 236 specifies the exact start point in the overall timeline for event 0. In the case of the first event in a timeline, this should generally be at time zero. Because the workflow and playback software should preferably support layering of video content, item 238 specifies layering information, which allows the player to position multiple assets appropriately (that is, if they are to be presented on top of one another, it is critical to specify which asset is on top, and which is below it.). Item 240 signals the end of the instruction set regarding event 0.

Item 242 signals the initiation of the instruction set for another event; item 244 specifies that it is the instruction set for event "1". Item 246 indicates that event 1 is to start at time code 0:00:00 which is the same as the start time for event 0. Item 248 indicates that the layer field is empty, which likely signifies that event 1 is audio-only, since layering is not particularly relevant for audio content. Item 250 indicates that the launch instructions for item 1 are complete.

Item 252 signals the initiation of the instruction set for another event; item 254 specifies that it is the instruction set for event "2". Item 256 specifies that the start time for event 2 is at time code 00:17:06, or seventeen seconds and 6 frames into the overall timeline. Item 258 specifies that event 2 is to be presented as layer 1, which means that it is behind content on layer 0. Item 260 indicates that the launch instructions for event 2 are complete.

Item 262 signals the initiation of the instruction set for another event; item 264 specifies that it is the instruction set for event "3". Item 266 specifies that event 3 is to begin nineteen seconds and 19 frames into the overall timeline; item 268 specifies that it is to be presented in layer 0, and thus on top of any other content. (In the preferred embodiment, the external "rule book" referenced in item 204 will specify the means by which the software running event coordination is to handle potential conflicts and ambiguities, such as when two events have both been specified to run as layer 0.) Item 270 indicates that the launch instructions for event 3 are complete; item 272 indicates that the overall launch control instruction section of the workflow file is complete.

The next sections of the workflow file present instructions for playback that are essentially internal to the individual asset being parsed, rather than explaining how to present one asset relative to another. Thus item 274 signals that an event is being described; item 276 tells the browser that this is event "0", and thus the first event to be presented. The first event is likely to be lead-in content such as a title sequence, but can be any form of content that is compatible with the system. Item 278 signals to the browser that the content of event 0 is in the form of HTML. Item 280 presents the URL where the browser or other playback software is to point in order to retrieve event 0. Item 282 uses the concept of offsets in order to tell the browser when to begin playback of the event relative to the internal timeline of the individual asset; the term "inset" is used to specify the delay between the absolute beginning of the source file and the point at which the workflow wishes to begin playback of the asset; "outset" is used to specify the point at which playback is to stop, which should also be specified relative to the absolute start of the source file. In this case, because inset is specified at 0, it is to begin at the beginning, but as is shown later, this need not always be the case. As previously described, timing information given in the launch control section of the workflow sets forth the timing of individual assets relative to the overall flow of the program. Item 284 specifies when playback of event 0 is to stop, which is specified as an offset from the zero mark in the individual file.

Many video files also include audio content as well. Thus the workflow should also specify how the playback system is to present the audio. Item 286 signals that the next section of the workflow is presenting instructions related to audio playback. Item 288 specifies that initial volume level should be 0, which permits a fade-up from nothing; item 290 specifies the point in the internal timeline of event 0 when the fadeup should begin. Item 292 specifies a rate of change associated with the fadeup effect. Item 294 specifies the volume level at the end of the fadeup effect. (There are many ways of specifying the duration and rate of such effects.) Item 296 specifies the initiation point for the next audio effect, which in this case is a fade down; item 298 specifies the rate of fadedown, and item 300 specifies the end volume level. Item 302 signals that the volume section of the workflow for this event is complete.

Item 304 signals that a video entrance effect is to be described. Item 306 provides information regarding the effect, if any to be applied at the browser level when beginning the playback of event 0. Such effects may include fade-ins, dissolves, wipes, etc. Such effects may be already included in the individual media files as retrieved by the browser, which may obviate the need for additional effects to be applied at the browser level. However, particularly in the case in which a content creator has repurposed existing content by, for example, presenting less than an entire file from one source and then transitioning to less than a complete file from another source, providing a means by which the software running locally on the playback device has both the capability and the specific instructions necessary to perform such transitions locally has real benefits. In this case, however, no local effects are required, as evidenced by the fact that there is no instruction between the open and close tags. Item 308 signals that the video entrance effect description for this event is complete.

Item 310 signals that the exit effect for event 0 is to be described. Item 312 specifies that a fadeout is to used, and item 314 specifies when the fadeout is to begin. Item 316 specifies the speed of the fadeout; item 318 signals that the exit description for this event is complete.

Item 320 signals that the items that come after it are metadata for event 0. These include the title 322, the owner of the event 0 content 324, copyright data 326, and keywords 328.

Item 330 presents the advertising code (as discussed in the context of item 222) for this specific asset; item 332 presents the exclusivity code (as discussed in the context of item 224). Also listed is the advertising-related account number in item 334.

Item 336 specifies the length of the event. Item 338 specifies the resolution of the file (in this case expressed as the number of pixels per row in the image). It may also optionally specify related parameters such as whether the video is interlaced or progressive in its scanning of each image. This may be done, as here, in pixels as is most commonly used in digital video. Item 340 specifies the frame rate (usually expressed as frames per second) of the video. Item 342 specifies the aspect ratio for the video content, which will generally be either 4:3 (traditional television) or 16:9 (HD), but other ratios are also possible.

Items 344 and 346 may optionally specify a "native" screen size, which may enable the use of dynamic screen sizing, which may be useful in some contexts, in case the producer of the workflow prefers that the video content not be automatically sized to fill larger screens. Item 348 specifies that the video content is to be displayed across the entire playback window (as opposed to being shown in split screen next to another event, etc.). Item 350 announces that the metadata for event 0 is complete; item 352 indicates that the instruction set for event 0 is complete.

Item 354 indicates that the description of another event is about to begin. Item 356 indicates that the event is the second event in the workflow (since the first event was event 0). Item 358 indicates that the event is the playback of an MP3 file, which is an audio-only format. Item 360 is the URL for the specific audio file to be retrieved and played back. Item 362 specifies the delay relative to the beginning of the audio file where playback for purposes of the workflow should begin. Item 364 specifies that playback should continue until the specified point in the file, which is specified with reference to the beginning of the individual file.

Item 366 signals the beginning of a series of instructions relative to playback volume. Item 368 specifies the audio playback volume at the start of playback; item 370 specifies the point in playback relative to the point at which playback was initiated when a fadeup is to begin, while item 372 specifies the rate at which the fadeup is to be executed. Item 374 specifies the volume level at the end of the fadeup.

Item 376 begins the specification of the next volume effect, which is a fadedown which is to begin 55.22 seconds into playback of event 1. Items 378-380 specify the remaining parameters of the fadedown. Item 382 signals that the volume-related section of the workflow for event 1 has concluded.

Item 384 signals that the workflow is now specifying the entrance effect for the video portion of event 1. Item 386 presents the place for the entrance effect, if any; the fact that no values or other information are presented between the open and close tags indicates that the video content is to be presented without any effects added at the playback level. Similarly, the absence of values in items 388 through 398 signals to the playback browser or other interpreter that no effects of any kind are to be applied at that level on entrance or exit.

Item 400 indicates the beginning of metadata for the event. Item 402 gives the title of the file (in the case, the name of a song). This may be useful in the event that the file's URI changes and the new URI is unknown, which may allow the computer parsing the workflow file to locate the file elsewhere.

Item 404 lists the owner of the audio file, while item 406 provides copyright information. Item 408 provides keywords describing the file content. As with the previous event, items 410-414 provide advertising and exclusivity codes that can be used to help monetize and, if desired, restrict use of the file.

Item 416 records the overall length of the event.

Item 418 identifies the bit rate for the audio content (in this case, 128 kilobit/second), while item 420 specifies the bit depth (in this case, 16), and item 422 specifies the sampling rate (in this case 44,100 samples per second).

Item 424 signals the end of the metadata for event 1, and item 426 signals that the workflow information regarding event 1 is complete.

Item 428 indicates that another event is being described. Item 430 identifies the event as the 3rd event to be presented (event 2). Item 432 identifies the contents of the event as a FLV file, a commonly used method for presenting multimedia content.). Item 434 gives the URL for the FLV file to be played. Item 436 specifies where playback should start relative to the internal timeline for the FLV file; item 438 specifies that playback should stop at the specified time, again relative to the internal timeline in the FLV file.

Item 440 signals that audio volume instructions are now to be given. Item 442 specifies the starting volume level; items 444-448 specify the remaining parameters for a fadeup effect.

Item 450 specifies that a fadedown is to be initiated at the specified point in the internal timeline; items 452 and 454 specify the rate of fadeout and the end volume level respectively. Item 456 indicates that volume-related instructions have been completed.

Item 458 indicates that an entrance effect for the video portion of the event is to be specified. Item 460 specifies the entrance effect for event 2, in this case wipe from the left. Item 462 specifies the rate for the effect. Item 464 signals the end of the instructions relating to the entrance effect. Item 466 signals the beginning of instructions relating to an exit effect for event 2. (It should be noted that it is possible to apply multiple effects on entrance or exit.) Item 468 specifies the exit effect as a fadeout. Items 470-474 specify the parameters of the fadeout. Item 476 indicates that the instructions in the workflow relating to the exit of event 2 are complete.

Item 478 indicates the beginning of metadata regarding event 2. Item 480 discloses the length of the FLV file. Item 482 gives the title of the event file. Item 484 specifies the resolution of that file. Item 486 specifies the native frame rate, and item 488 specifies the native aspect ratio. Items 490 and 492 specify the native size of the playback window. Item 494 signals the end of the metadata section, and item 496 signals the end of the instructions for event 2.

Because event 2 is the last event in this program, item 498 is the signal that the workflow file is ending. However, a complex program may be longer and more complex, and may present instructions for several hundred events or more.

The specific fields and instructions listed are examples of what is possible with the subject invention, but it will be possible to specify additional parameters, and to specify and control the parameters discussed in alternate ways.

Workflows can also be used to customize the content each viewer sees as part of a given program. For example, a workflow may include pointers to audio tracks in multiple languages. A viewer whose language preference has previously been set or detected automatically as Mandarin may receive a different audio track as compared to a viewer preferring Cantonese, although both may see the same video content. Parental controls could be used to exclude versions of programs with excessive violence, but permit sanitized versions of the same content to be viewed if such restrictions have been set. Alternate musical scores can be provided to help a program appeal to a broader audience. The workflow can also be structured with branching instructions, such that the user's browser can be directed to a particular version of content based on metadata such as user preferences, user location, date or time, presence or absence of content access tokens (e.g. DRM) etc.

Figure 3:
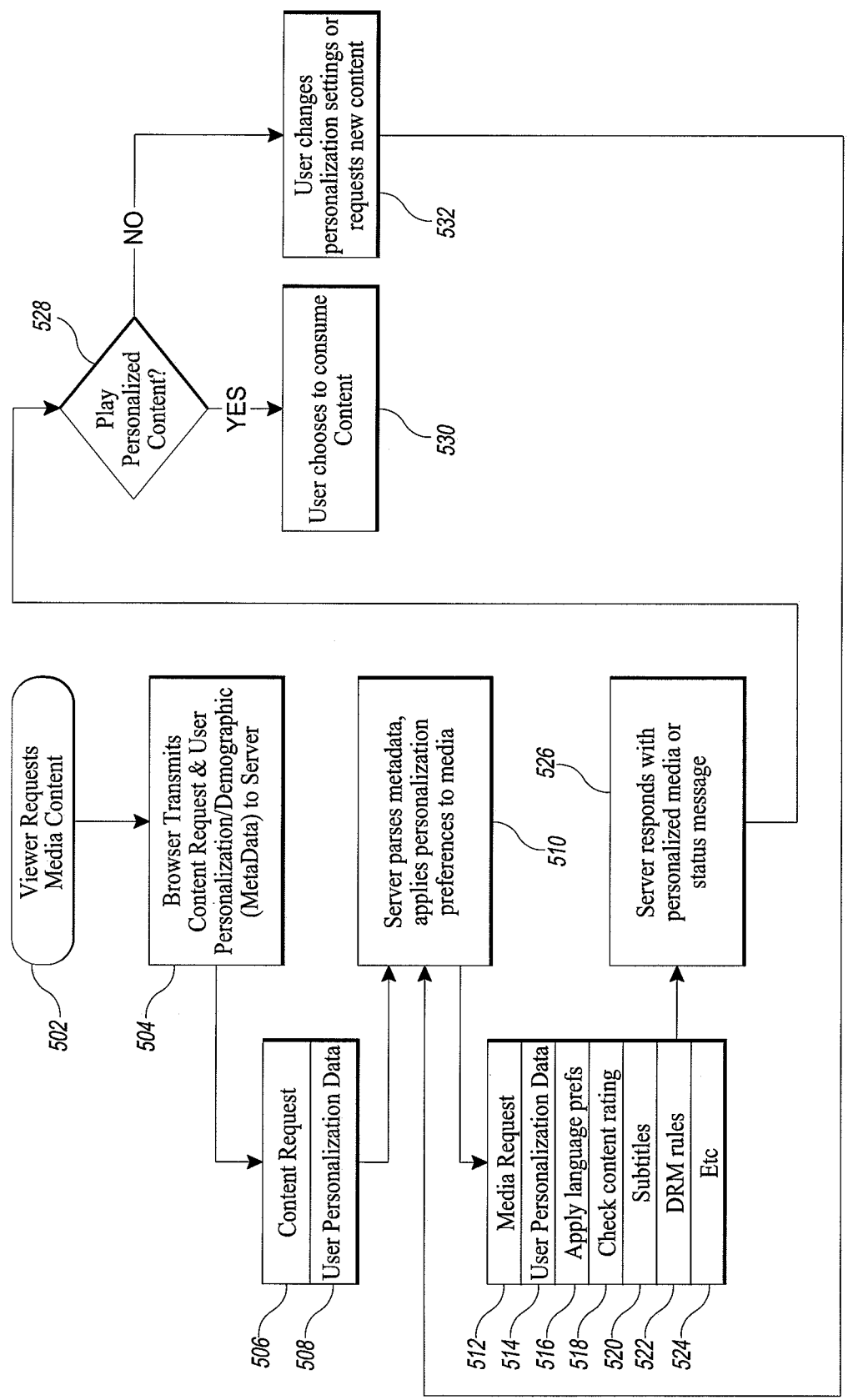
FIG. 3 shows an example of how such a workflow can be used to customize content for different viewers.

FIG. 3 illustrates how workflows may be used to customize content for different viewers. In step 502 the end-user consuming content on client device 104 requests a channel, program or even specific content element. In step 504, the browser or other playback software transmits both the explicit request as well as the relevant personalization data to server 106 operating the subject invention. Such personalization data may include a wide variety of elements, such as browsing and viewing history, information about paid content previously purchased or subscribed to, location-related information, language preferences, information about the device being used to view the content, and any other data related to a consumer that may be stored in cookies, electronic wallets, etc.

Once the content request 506 and personalization data 508 have been transmitted to the server 106, server 106 applies relevant heuristics (as is commonly understood in the art) 510 to customize the content to be server to the viewer. Parameters to be customized may include serving different media files 512, applying user specific personalization 514 (such as inserting a viewer's name into a title slide or audio track), choosing the language for audio and title slides 516, adjusting content elements 518 (e.g., skipping violent scenes for younger viewers), including or excluding subtitles 520, applying DRM (digital rights management) restrictions 522, or other changes 524.

Once the server 106 has determined the appropriate content for a specific viewer, the server can either begin presenting the personalized content, or can serve a message asking the viewer if the viewer accepts the choices made 528. For example, the server could present a message that says, "Here's Robocop dubbed in Cantonese, with Chinese subtitles, in G-rated form. Click 'OK' to begin, or click 'change preferences' to make changes'."

The viewer can then accept the suggestions 530, in which case playback begins, or can elect to make changes 532, in which case a menu can allow user to change language, rating, etc.

Although in theory a workflow could be created through line commands entered by the content aggregator (i.e. show producer), it is assumed that the preferred method for creating workflow files will be through a graphic user interface provided by a portion of the invention. In the currently preferred embodiment, the user interface will in some respects resemble video editing consoles used in television production. However, in the currently preferred embodiment, although the user will have the experience of editing and creating content on the user's own computer 104, in fact the work will generally be performed within a browser, or client application, and the files and workflows will generally reside on servers 106.

Thus the subject invention will provide a program creator with the tools required to create and combine the elements of a program. It can also present a "network executive" with simplified tools that could be used in order to combine programs into persistent stream analogous to network programming on traditional video.

As described in greater detail below, conceptually there are two ways of using the subject invention to create content: the creation of individual segments, and the compilation of individual segments into longer forms of content. (The lines between these two forms may be blurred in that compilations may also involve editorial changes that themselves may be considered acts of creation, and individual segments could consist of nothing more than a series of clips complied from other sources.)

Figure 4:
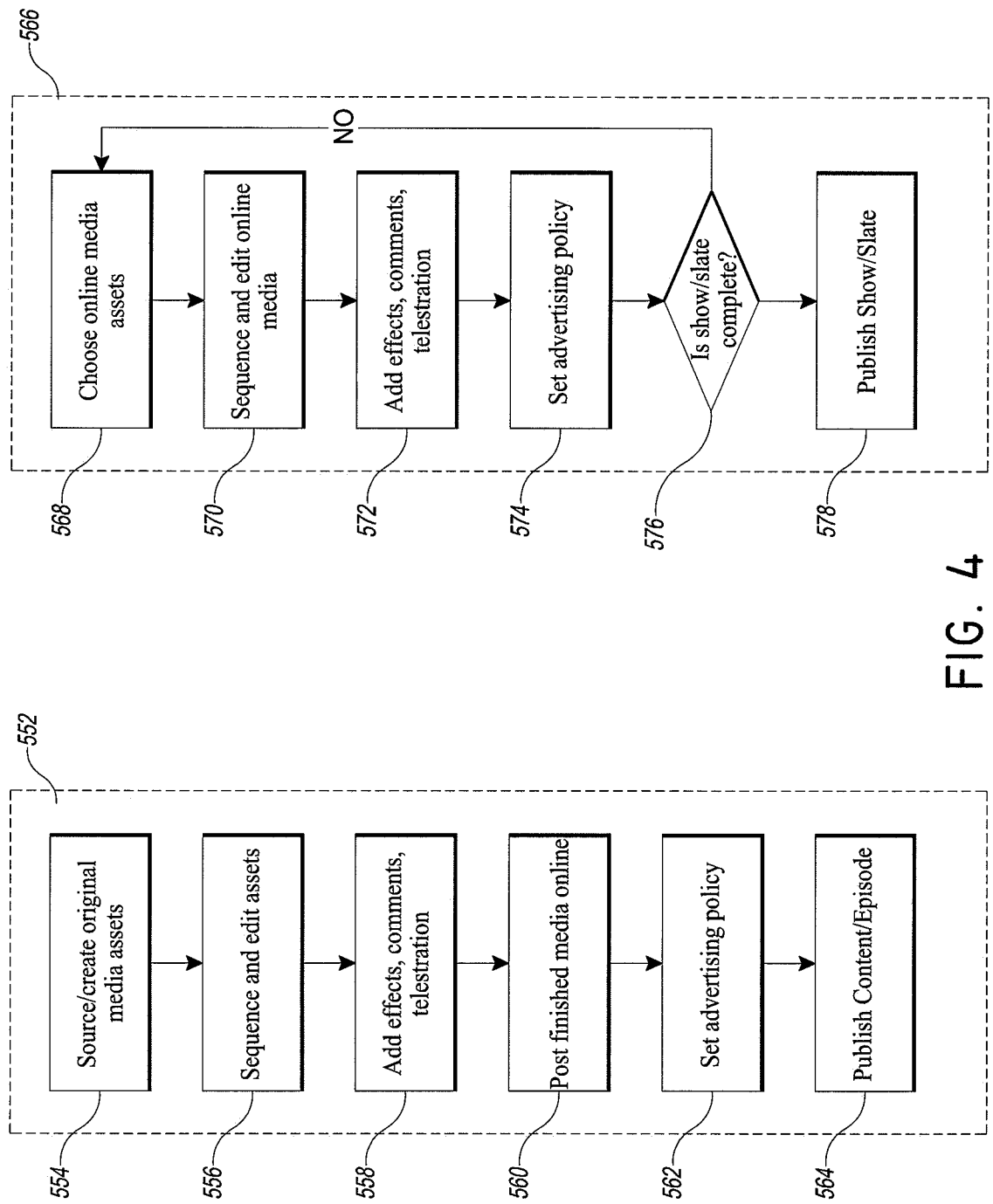
FIG. 4 illustrates certain differences between creating individual pieces of content and creating compilations of multiple elements.

FIG. 4 shows a high-level version of the differences between creating an individual piece of content as opposed to creating content that consists of a compilation of other content elements. The process of creating an individual content element 552 will comprise steps including finding or creating individual media assets 554; editing and sequencing those individual elements as desired by the writer/producer 556; adding visual and audio effects 558; saving the completed element to an online server 560; creating advertising rules for the element 562; and publishing the content in order to make it available to viewers and aggregators 564.

Also show in FIG. 4 are the steps involved in aggregating individual elements (which could consist of small building blocks like individual clips that may be only a few seconds long, all the way up to individual programs that could be as long as an hour or more) in to shows or slates of shows 566. The aggregator first chooses individual media assets 568; then places them in a desired order, edits for length, etc. 570; adds transitions, effects and other unifying elements 572; sets the advertising policy for the show or slate 574; then decides whether the show or slate is ready for viewing 576; then (assuming it is ready) published the show or slate 578.

Figure 5:
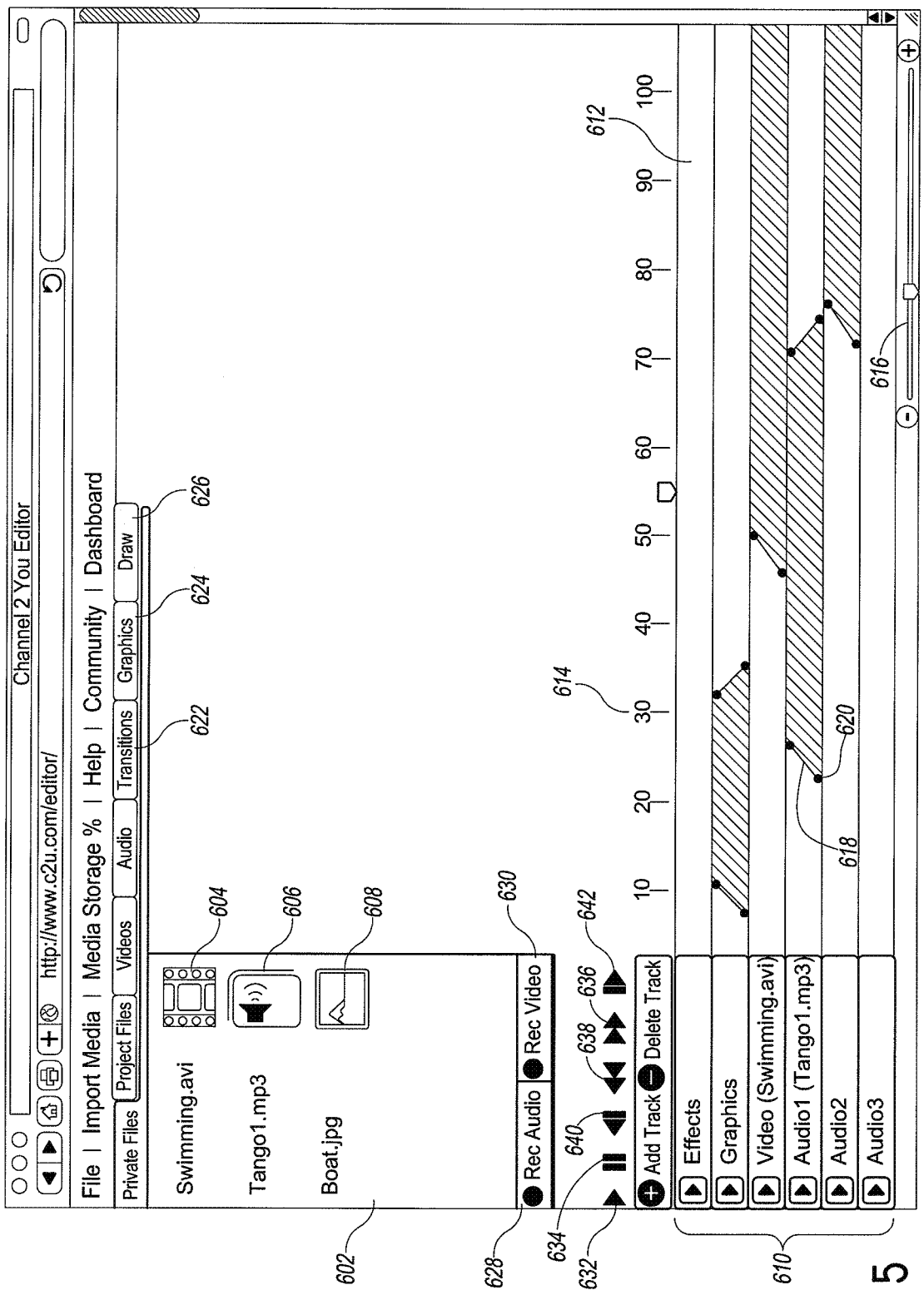
FIG. 5 shows an example of a user interface that can be employed to create content.

An example of the kind of user interface that could be used to create a program, segment or channel as well as the workflow files that represent them is shown in FIG. 5. Individual components that the user has previously collected for possible use in the final product are displayed in the files section 602. These files will generally consist of video clips 604, but audio-only clips 606 and static graphic files 608 may also be used. Some of those files may initially reside on the computer 104 being used by the producer; others may reside on one or more servers 106; still other may be located on various 3rd-party servers on the Internet. However, it will make program creation more efficient if the user interface presents these disparate sources through a common UI and allows the user to treat them in more or less the same way regardless of their source.

The primary tool used to put together a finished program is the timeline window 610. Preferably the user will be able to drag icons that represent files onto the timeline, then use a mouse or other cursor control to adjust the location of start and end points along the timeline. Multiple "lanes" 612 within the timeline allows the producer to use several different elements as building blocks for the same program. A dynamic time index 614 will show the time scale for the program or segment of a program being edited. Zoom control 616 allows the producer to view a few seconds of the timeline in great detail, in order to fine-tune the timing of various elements, or zoom out to see the overall timing of a program, and time index 614 will adjust as the zoom control is altered. By adding multiple files that do not (completely) overlap, longer programs can be assembled; adding files that do overlap on the timeline creates the possibility to create a variety of effects, such as composites and transitions as well as complex soundtracks. Among the simpler types of effects are fade-ins and fade-outs. One way of allowing control of fades and other effects is to use the vertical aspect of each lane to represent the volume or intensity of a specific element or progress of the effect, so that a height of zero means that the element is completely omitted, and a height of 100% equals full volume or intensity. Thus a line 618 indicating intensity may be represented in each lane, and can be pulled up or down where changes are desired. Anchor points 620 may be placed on each line 618 with the cursor in order to enable smooth, straight-line gradients between target points. A transitions menu 622 may present other transition tools, such as dissolves, blurs, wipes, etc. A text and graphics menu 624 may present various options for creating text that can be combined with graphics, such as titles, credits, etc. A draw menu 626 may present tools that may be used to create "telestrator" effects, allowing the producer to create hand-drawn sketches that are superimposed on other video images in the workflow. Tools to permit chroma key compositing may also be provided, allow users to create "green screen" effects.

The producer can also layer audio tracks with the video. As with the video, these tracks can be sourced from multiple locations, including soundtracks created by the producer, files found in various locations on the Internet, etc. An audio record button 628 allows the producer to add simple voiceovers if a microphone is attached to the producer's computer, or by using a built-in microphone, if one is available. Similarly, a video record button 630 allows a producer to create new video content if a video camera is attached to the computer, or by using a built-in video camera if one is available.

A workflow can also include a pointer to a different workflow, so that when the program selected by a viewer is finished, another workflow file can be retrieved and its content can be prepared for subsequent viewing, and the viewing experience can be seamless from the viewer's perspective. This permits the easy building of programs from individual segments, and long-term "network" streams from individual programs.

Once a producer feels a program is finished (or wants to save an intermediate work copy of the program), choosing to save the file results not in a literal save of the composited file on a pixel-by-pixel, frame-by-frame basis, but creation of a workflow file, which will record the high-level instruction set for playback as described in FIG. 2. The workflow file will capture the choices made by the producer in an extremely compact form. For example, if a producer first creates a workflow in which video clip A starts at time stamp 0:00, and video B starts at time stamp 1:25, the workflow file will simply record those start times, rather than the resulting frame-by frame output file. If the producer subsequently decides that video B should start at time stamp 1:21, and accomplishes that change by dragging the marker for the start time to 1:21 in the timeline window, (or potentially by directly entering the new time code), the only alteration to the workflow file is the entry in which the start time for video B is stored.

Other elements of the editing console may include playback controls, including buttons for play 632, stop 634, buttons to move forward 636 and backward 638 a single frame, and for moving all the way to the beginning 640 or end 642 of the workflow file. Another element the editing console may include is a clock, which may display the relative location within a workflow in minutes and seconds or in frames.

These tools will enable users to easily create new content based on existing content. For example, a user wishing to demonstrate that a given politician's campaign ad is misleading can create a new video that combines footage from that ad with news footage of the same politician contradicting what the politician says in the ad, or present the ad side-by-side with a graph of economic data that disproves what the politician says, or provide audio rebuttal and commentary, etc.

Figure 6:
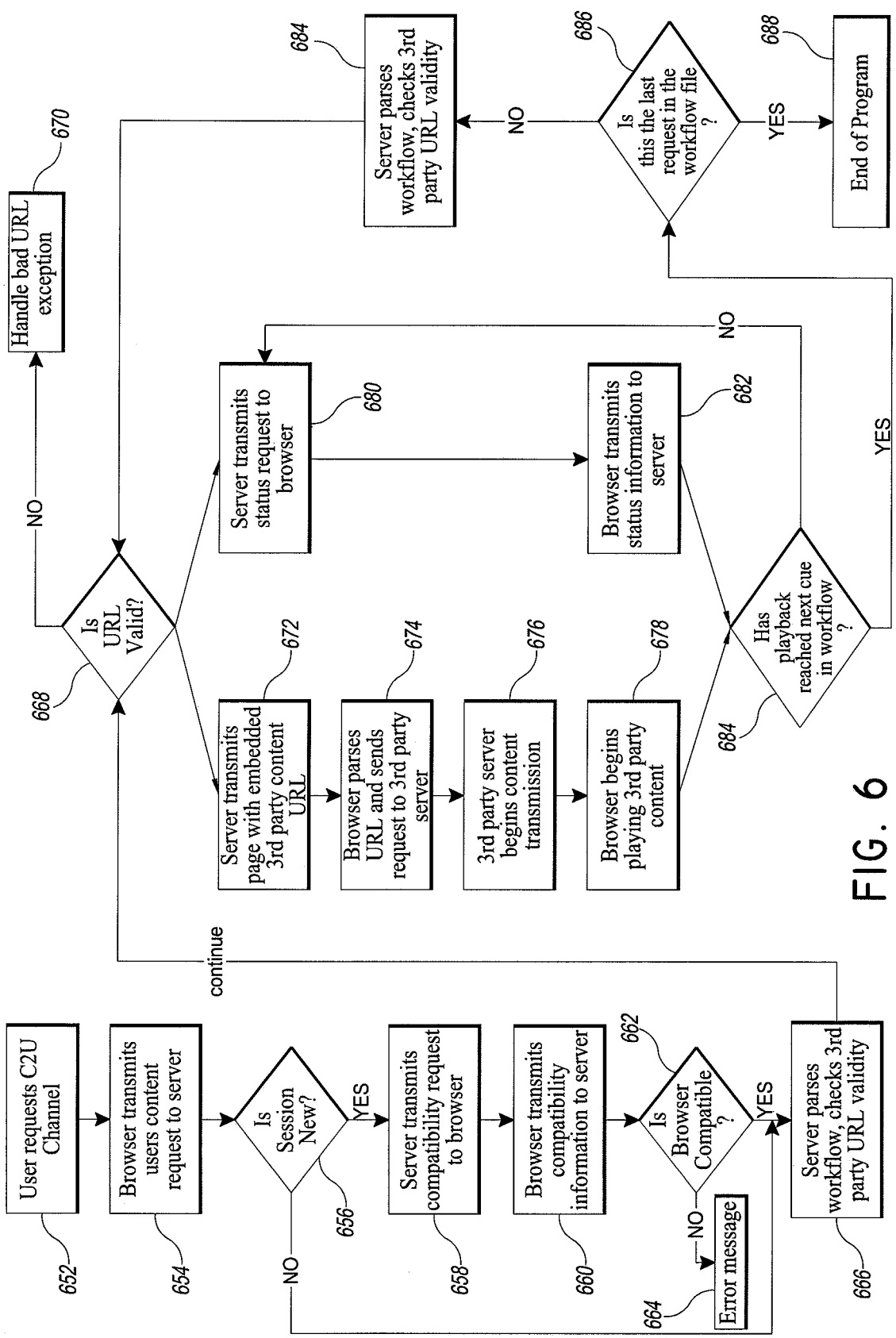
FIG. 6 shows an example of how content created using an embodiment of the invention can be played back.

Once a workflow has been created as previously described, in one embodiment, the instruction set that manages how content is delivered to a given end-user viewer is stored on one or more computers 106. When a viewer wishes to watch a program represented by such a workflow, servers 106 execute the workflow as shown in a representative example of this process as illustrated in FIG. 6. In step 652, the end-user selects a channel or program to view in the browser on computer 104. In step 654, browser 104 then transmits a request for that program to server 106a via network 102. In step 656, server 106a determines whether the request is establishing a new session (i.e., whether a new viewer is starting to watch a program) or if the request is part of an ongoing session. If it is a new session, the server establishes appropriate handshake information in steps 658 through 664. If the request is part of an ongoing session, these steps can be skipped, and the process skips to step 666. In step 658, server 106 transmits a browser compatibility request to computer 104. This request may include queries regarding the browser being used, the absence or presence of browser plug-ins that may be required or beneficial for the playback of various types of content, the resolution of the display, the size of the window being used to display the content, the speed of the Internet connection, the size of memory cache available, etc. This information may also be embedded in the original request 652, obviating the need for a separate step.

In step 660, client computer 104 transmits compatibility information to server 106*a*. In step 662, server 106*a* evaluates the information received and determines whether the client is capable of playing the requested program. If not, then in step 664 server 106*a* transmits an error message to the client. If browser passes the compatibility check, then in step 666 server 106*a* moves forward with processing the request.

In step 666, server 106 executes a "pre-flight" check on the content in the selected workflow. This process may include confirmation that the next element in the workflow is actually available at the URL included for it in the workflow. (Alternately, server 106*a* can pre-flight the entire program at the beginning of the workflow.) In step 668 server 106*a* determines whether the URL is valid. If it is not valid, then in step 670 server 106*a* follows a previously determined process for handling such an exception.

This step is desirable because it is not unusual for video and audio files up loaded to publicly accessible sites to periodically disappear, be renamed, etc. In the absence of a workaround strategy, the viewer is likely to sit staring at a "File Not Found" error message or the like until either (a) the next video segment begins at its scheduled entrance, or (b) the viewer "changes the channel." In order to prevent the latter outcome, the workflow can specify various strategies for recovering from missing files and other defects. For example, the workflow can specify alternative content to be used in the event a specific file is not found; it can specify how far to "fast forward" through the file in order to present a reasonably seamless viewing experience to the viewer, it can use metadata or other criteria to search for alternate content, etc.

In step 672 server 106*a* serves a page to client 104. In addition to various framing elements, the page contains the URL for the content that was pre-flighted in step 666. In step 674 the browser running on client 104 sends a request for the content specified in the URL contained in the page served to client 104 in step 520. In step 676 third party server 106*b* begins streaming that content to client 104, which may be buffered in order to smooth playback. In step 678, the browser running on client 104 begins to play the media file.

Because in this embodiment the computer that executes the workflow is not the computer to which the content is being delivered, it is desirable that server 106*a* be aware of the status of playback on client computer 104. In parallel with steps 672 through 678, server 106*a* transmits at least one request 680 to the browser running on client 104 in order to determine the status of playback of the content embedded in the page sent in step 672. The intent is to allow server 106*a* to stay appraised of the progress in the browser running on client 104 of playback of the media specified in step 672. In step 682 the browser running on client 104 responds by transmitting progress information to server 106*a*. Such information may consist of reports regarding the "size of the pipe"—i.e., how many kilobits or megabits per second are being received by the playback system from the site that is streaming the source file. Alternatively, it may consist of reporting the time code of the last frame of video played back, or even a simple "playback OK" or "playback halted."

In step 684 server 106*a* determines whether playback on client 104 has reached to point in playback at which the next element of the program should be requested. If not, the steps 680 and 682 continue to loop until that point has been reached. When it has been reached, in step 686 server 106*a* determines whether the content for which playback is nearly complete is the last content requested in the workflow file being played back. If so, then in step 688 server 106*a* terminates administration of the workflow file, and the client 104 continues playing back the content until the previously retrieved URL completes playback. If not, then in step 690 server 106*a* pre-flights the next content to be played back much like in step 666, and the loop continues from step 668.

Figure 7:
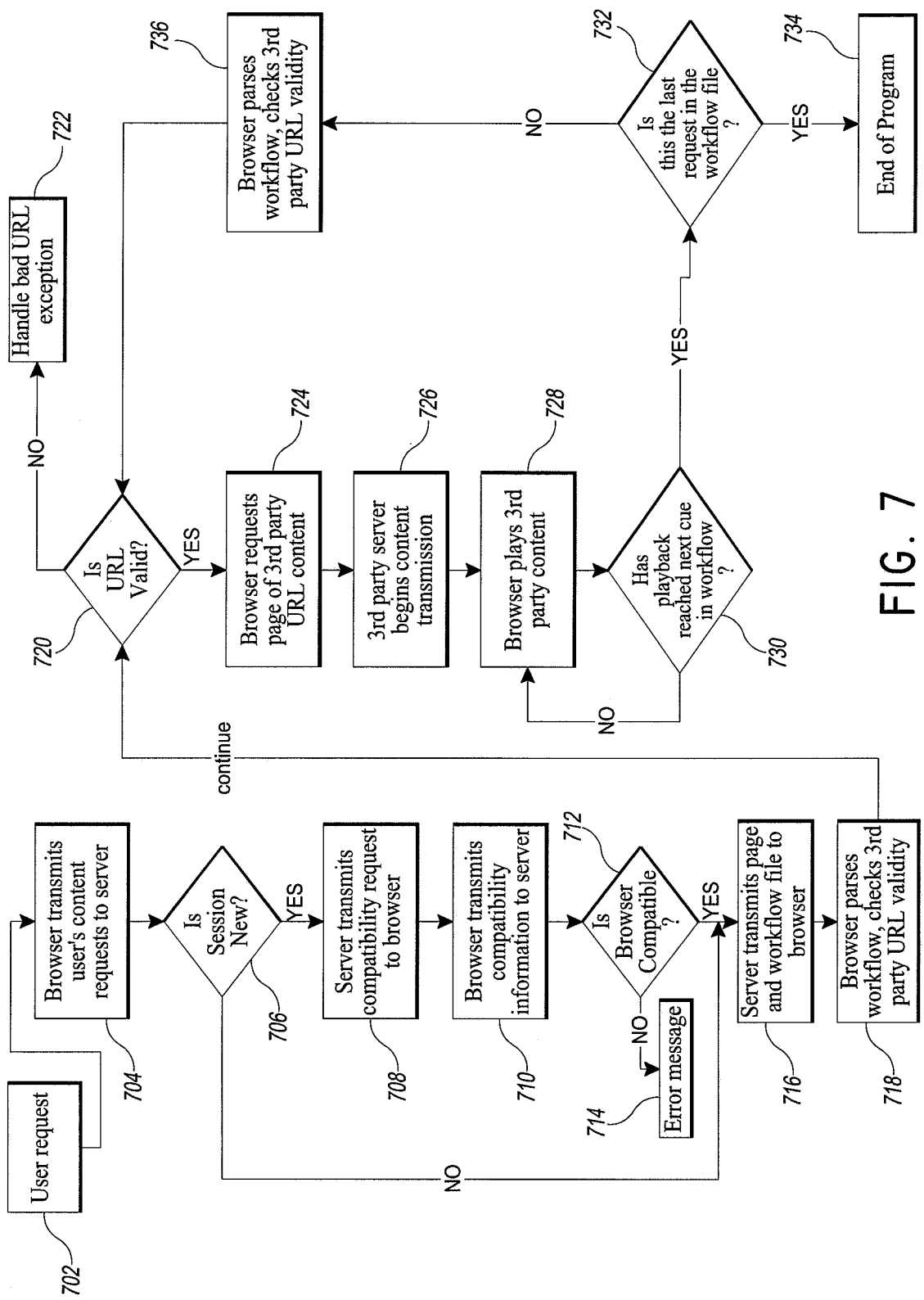
FIG. 7 shows another example of how content created using an embodiment of the invention can be played back.

If the workflow is to be executed on the client side, the process is slightly different, and may proceed as shown in FIG. 7. In step 702, the end-user selects a channel or program to view in the browser on computer 104. In step 704, browser 104 then transmits a request for that program to server 106*a* via network 102. In step 706, server 106*a* determines whether the request is establishing a new session (i.e., whether a new viewer is starting to watch a program) or if the request is part of an ongoing session. If it is a new session, the server establishes appropriate handshake information in steps 708 through 714. If the request is part of an ongoing session, these steps can be skipped, and the process skips to step 716. In step 708, server 106 transmits a browser compatibility request to computer 104. This request may include queries regarding the browser being used, the absence or presence of browser plug-ins that may be required or beneficial for the playback of various types of content, the resolution of the display, the size of the window being used to display the content, the speed of the Internet connection, the size of memory cache available, etc. This information may also be embedded in the original request 702, obviating the need for a separate step.

In step 710, client computer 104 transmits compatibility information to server 106*a*. In step 712, server 106*a* evaluates the information received and determines whether the client is capable of playing the requested program. If not, then in step 714 server 106*a* transmits an error message to the client. If browser passes the compatibility check, then in step 716 server 106*a* moves forward with processing the request.

In step 716, server 106*a* transmits the workflow file to the browser running on client 104. In step 718 the browser begins parsing the workflow by "pre-flighting" the workflow by determining whether the URL of the first content file is valid. In step 720 it determines whether the first URL is valid. If it is not valid, then in step 722 server 106*a* follows a previously determined process for handling such an exception. That process may involve skipping the content called for by the corrupted link, or could instruct the browser to send an error message to server 106*a* and process response, or some other error-handling process. If it is valid, then in step 724 the browser retrieves the asset from the 3rd-party URL (The file could also be located on servers managed, owned or operated by the same provider as the one providing the subject service). In step 726, the 3rd-party server begins streaming the selected content to client 104. In step 728, the browser running on client 104 begins playing the content. In step 730, client 104 determines whether playback has reached to point at which the next element of the program in the workflow should be requested. If not, the steps 728 and 730 continue to loop until that point has been reached. When it has been reached, in step 732 client 104 determines whether the content for which playback is nearly complete is the last content requested in the workflow file being played back. If so, then in step 734 client 104 terminates administration of the workflow file, and the client 104 continues playing back the content until the previously retrieved URL completes playback. If not, then in step 736 client 104 parses further through the workflow, and then returns to step 720 in order to pre-flight the next content to be played back and the loop continues.

Figure 8B:
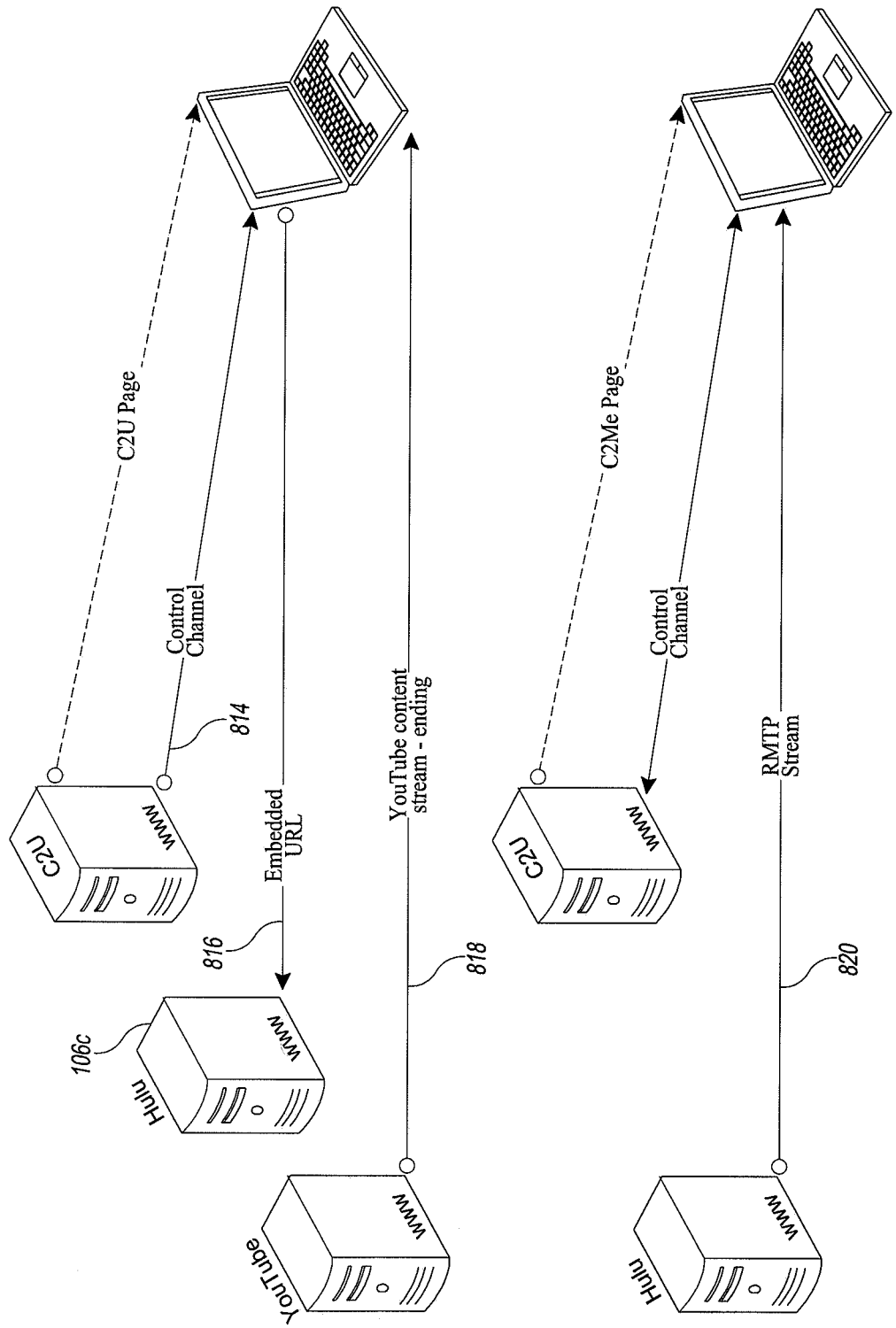

FIGS. 8a and 8b illustrates the components of one embodiment of this aspect of the invention and gives another view of the steps involved when the workflow process is managed by server 106a. Server 106a manages connections with and receiving requests from and delivering content to client computers 104. (In practice, an implementation designed to operate at significant scale would be larger and more complex, and would likely include many parallel devices, load balancers, caching servers, firewalls, etc., all as are well understood in the art.) Servers 106b are streaming media servers that host media files and the software to stream those files across the network 102.

In step 802 client 104 requests content from server 106a, which begins the process by which the workflow file is executed on server 106a. In step 804 server 106a transmits a response that includes instructions directing client 104 to retrieve the first content elements from 3rd-party servers. In step 806 client 104 transmits the content request to server 106b. In step 808 server 106b begins transmitting the requested content to client 104. While this content is being retrieved and played back, client 104 and server 106a repeatedly exchange messages in step 810 so that server 106a remains aware of the status of playback of the content being streamed from server 106b. In step 812, server 106a may periodically update elements seen on client 104 (frame elements, ads, etc.). Server 106a may also alter how the content streaming from server 106b is displayed (e.g., altering layering, transparency, size, volume, etc.).

In step 814, having determined from the status reports received from client 104 that playback of the content retrieved from server 106b is nearing its end, server 106a transmits the next URL to be requested to client 104. In step 816 client 104 transmits the corresponding content request to server 106c. Thus when in step 818 the playback of the content from server 106b ends, server 106c is ready to being streaming the next element of the workflow in step 820.

This process of stepping through the workflow file, initiating contact with 3rd-party servers continues until the workflow has been completed. If some of the files required by the workflow are located on server 106a (or on attached servers intended to provide content in the event the provider employs a more elaborate architecture), those files can be provided by server 106a (or related servers).

Figure 9B:
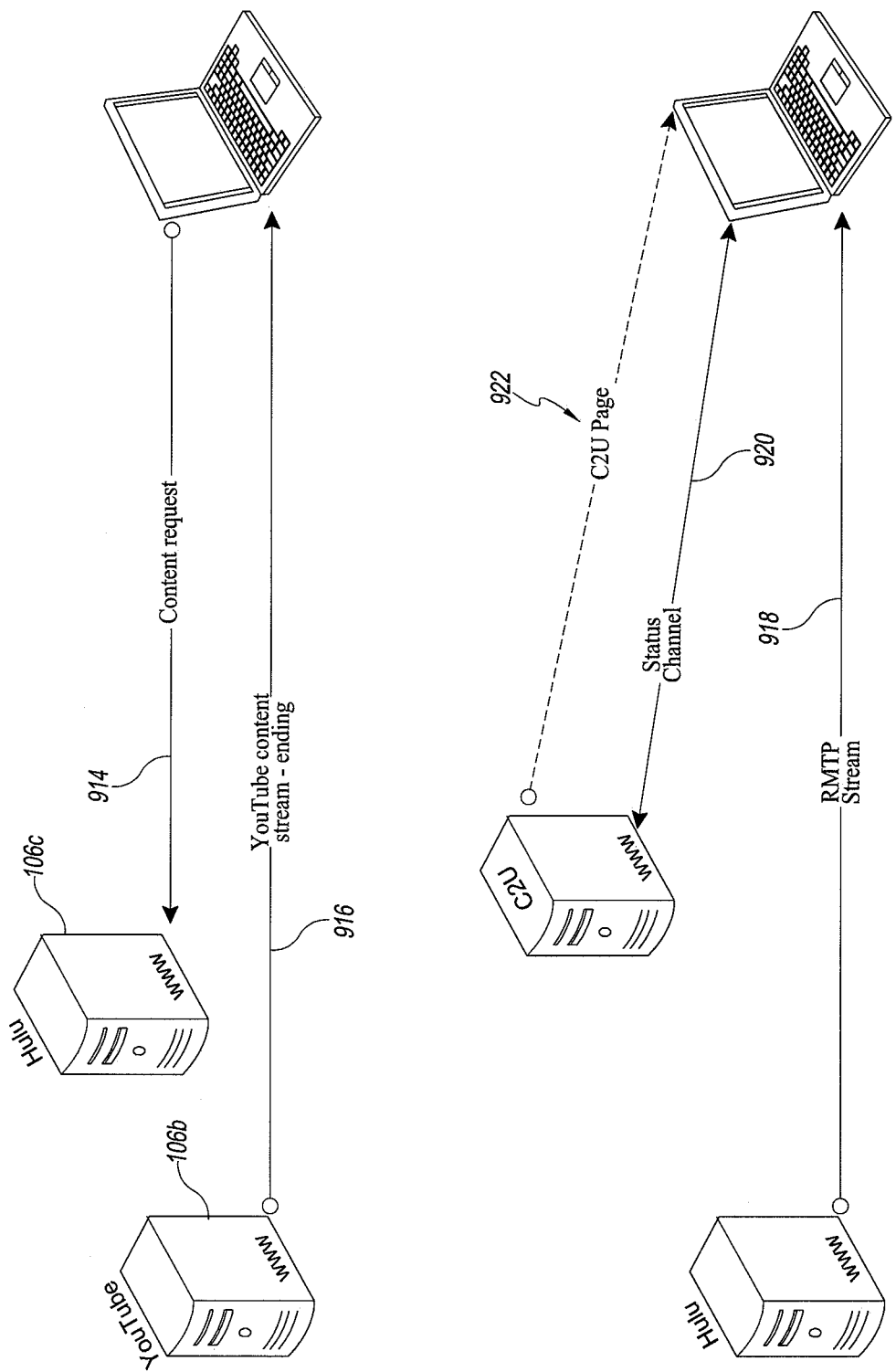

The steps are slightly different when the workflow executed on client 104, as shown in FIGS. 9a and 9b. In step 902 client 104 requests content from server 106a. In step 904 server 106a transmits a response that includes the workflow file to client 104. Client 104 then begins to parse the workflow file and in step 906 sends a request to server 106b to retrieve the first content element. In step 908 server 106b begins transmitting the requested content to client 104. Optionally, client 104 and server 106a may exchange messages in step 910 so that server 106a remains aware of the status of playback of the content being streamed from server 106b. In step 912, server 106a may periodically update elements seen on client 104.

In step 914, having determined from the status reports received from client 104 that playback of the content retrieved from server 106b is nearing its end, server 106a transmits the next URL to be requested to client 104. In step 916 client 104 transmits the corresponding content request to server 106c. Thus when in step 918 the playback of the content from server 106b ends, server 106c is ready to being streaming the next element of the workflow in step 920.

A key aspect of the subject invention is that it enables a seamless and flexible hierarchy of participants in the ecosystem that connects a multitude of creators of individual pieces of content with end users and advertisers.

Figure 10:
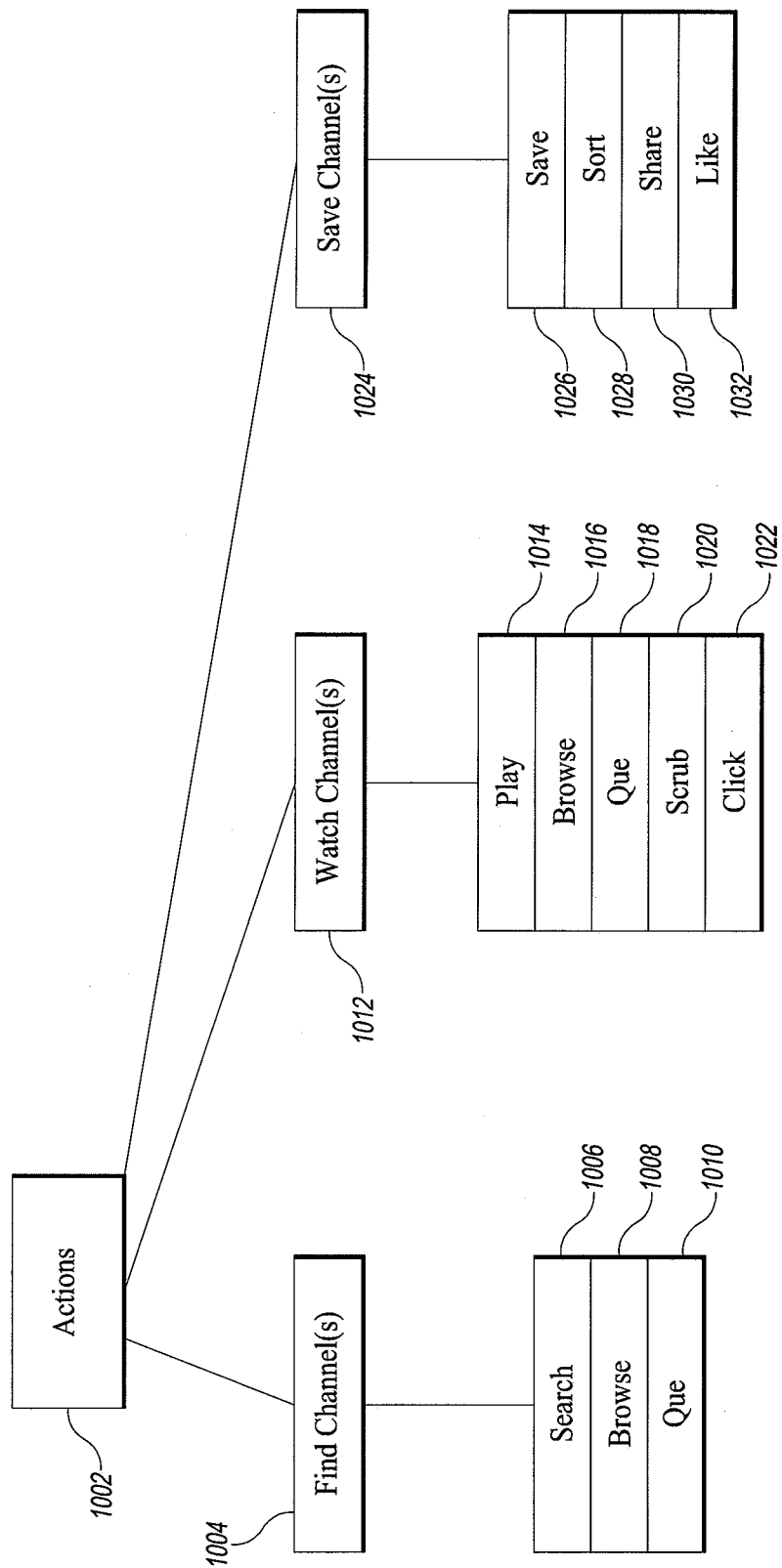
FIG. 10 shows a way of visualizing various methods by which users of certain embodiments of the invention can interact with the subject invention as viewers.

From the standpoint of an end user, the ways of interacting with the subject invention are shown in FIG. 10. The choices available to the end user may be thought of as different actions 1002. The first logical action would be to find a channel 1004. A user may use a web browser or similar tool on client computer or other device 104 to search 1006 for something to watch. That searching could consist of reviewing channel listings, or might consist of a conventional search for a keyword or specific item of content. Thus a viewer could search specifically for "The Internet Football Channel", if aware of that channel, or "John Doe's Superbowl Review," if aware of the existence of that program, or could just type "The Catch" into a browser in order to see footage of the catch of a Joe Montana pass by Dwight Clark in the 1982 NFC Championship game.

It should be noted that because most content will be presented as part of a channel of programming, even if the user searches for an individual item of content, the continuous nature of programming with the subject invention means that, once the sought piece of content is complete, additional content will continue to play, just as when watching traditional television (and unlike other means of presenting web videos today).

Viewers will also be able to browse 1008 through various guides and program listings in order to find interesting channels and programs. Thus typing "football" into a listing of channels would bring up a selection of channels, ratings, summaries, etc. Such searching is likely to be more effective if content creators add appropriate metadata to the workflow files they create.

Viewers will also be able to select potentially interesting channels and programs and can add 1010 them to a queue for viewing. Thus when a viewer decides to stop watching a selected channel, rather than using the remote control to surf through numerically consecutive channels that may be of little interest, the viewer can surf through a series of channels that have already been pre-screened as potentially worthy of watching.

Viewers will also be able to use the subject invention by watching 1012 channels. Watching can take several forms. In the simplest and most passive approach, a viewer can simply watch 1014 a specific channel: because even when the viewer has selected an individual program, content is packaged in channels, which means it will continue to play. While watching, the consumer can also browse 1016. Browsing may consist of channel surfing through channels pre-queued by the viewer in item 1010 above, or can consist of flipping through channels advertised or recommended in the frame placed around the content the viewer had previously selected. Because server 106a is aware of both what is being watched at present as well as what has been watched in the past, the subject invention will be in a position to make well-informed predictions about what kinds of programming are likely to appeal to the viewer. These predictions can be used to present choices a viewer will enjoy, and to sell such secondary windows as advertising space, so that a network executive or executive producer can choose to buy "ad space" that is highly conditional and narrowly targeted.

Viewers can also, while in the midst of watching the subject invention, queue 1018 programs for later watching. Thus if a program looks interesting, but the viewer doesn't have time to watch it when first noticing it, or if a viewer prefers to save it for viewing with other family members, etc., the viewer can add it to his or her queue.

Viewers will not necessarily be forced to watch an entire program in linear fashion. The watching tool may present controls that allow the viewer to scrub 1020 backwards or forwards through a program. This capability will be of great value to many consumers, as it allows viewers to replay missed dialogue, key plays in sporting events, etc., as well as allowing them to skip over portions they find boring. Content creators will have the ability to set permissions that may, for example, prevent users from skipping commercials or otherwise restrict this capability.

Finally, viewers will be able, as with conventional web browsing, to click 1022 on ads and other interactive content. This will enable a number of important features. Advertisers and content creators may wish to increase customer engagement by making offers that are dependent on some form of call to action from viewers, or giving viewers the ability to influence the viewing experience. Such actions could be as simple as time-limited banner ads placed in the frame surrounding the main media frame, or could be as complex as asking viewers to vote on how a given program should proceed (e.g., "should Fabio kiss the maiden? Click here for yes!") or asking viewers to click on specific regions within the main content window to change playback parameters like camera angles. The workflow structure can easily accommodate such conditional playback scenarios.

The other broad category of actions a user can take is to save 1024 channels. In the preferred embodiment, a user will be able to create one or more lists of channels, much as users can save favorite bookmarks in a web browser. Because it is anticipated that the subject invention will eventually enable not just thousands but potentially millions of channels, it will become impossible to surf through them all—users will likely want to create their own channel guides. These guides can be grouped or segregated by whatever schemes make sense to users, and can contain everything from major established television networks, to personal feeds from friends or relatives. Thus users can save 1026 channels to various lists, and they can sort 1028 and organize those lists. They can also share 1030 and publish those lists, to allow the social media aspects of the invention to develop. Thus users can give permission to other users to see some or all of their channel lists, so that it becomes easier for users to find content they are likely to enjoy based upon affiliation. And finally, users can "like" 1032 content, again enabling another form of signaling to other users as to the likelihood of a given program or channel being appreciated by a given viewer.

Figure 11:
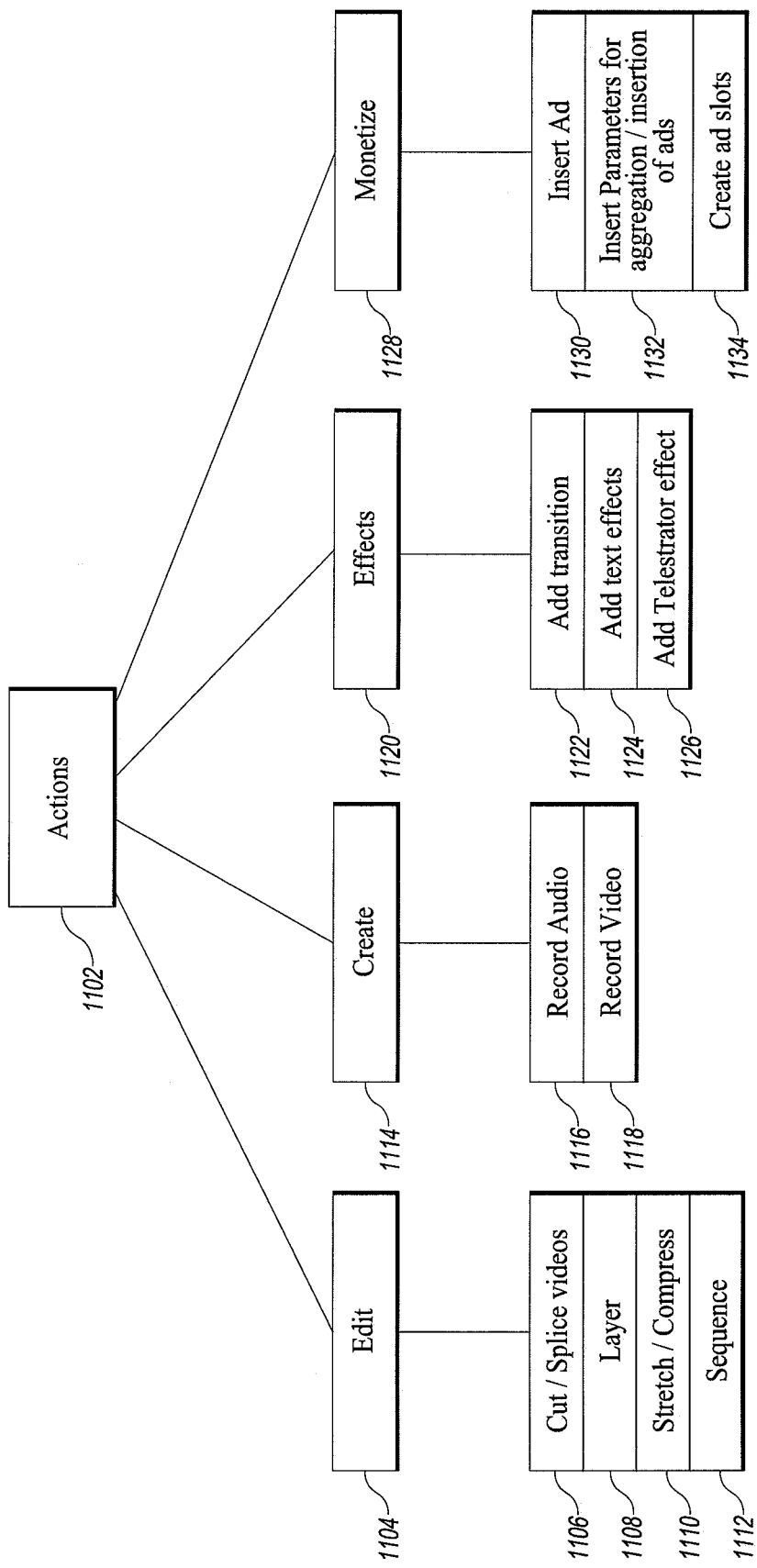
FIG. 11 shows a way of visualizing various methods by which users can interact with an embodiment of the invention as creators of individual segments.

Actions 1102 available to a creator of individual segments are shown in FIG. 11. The primary type of action will be to edit 1104. A few specific editing actions that can be executed using an interface such as the one described in FIG. 5 include cutting and splicing 1106, in order to remove unneeded portions of a source file; layer 1108 which can include both adjusting transparency and assigning content to different layers; adjustment of length 1110, which can consist of stretching or compressing the length of a given piece of source material to better fit into the intent of the final segment or program; and sequencing 1112, which can consist of creating a longer segment by defining different start and end points for multiple components. Many other editing functions will also be possible, such as adjusting color balance, brightness, and contrast, adjusting dynamic range and equalization of audio tracks, etc.

A segment creator can also create entirely new content 1114. Broadly speaking, such creation can consist of recording new audio 1116 as well as recoding new video 1118.

A segment creator can also add effects 1120 to a segment. Possible effects could include adding transitions 1122, such as fades, wipes, dissolves, etc.; adding text effects 1124, such as titles, subtitles, etc.; and adding telestrator effects 1126, such as when drawing on a still image of a play in a ballgame to highlight key positions, etc.

Finally, a segment creator can add metadata that signals appropriate ways to monetize the segment 1128. This can consist of inserting specific ads 1130, but can also include creating parameters 1132 to be used by others when they (e.g., executive producers and network executives) insert ads in to the segment, and to create preferred locations in the segment 1134 where those other participants in the ecosystem can later insert ads 1134.

Figure 12:
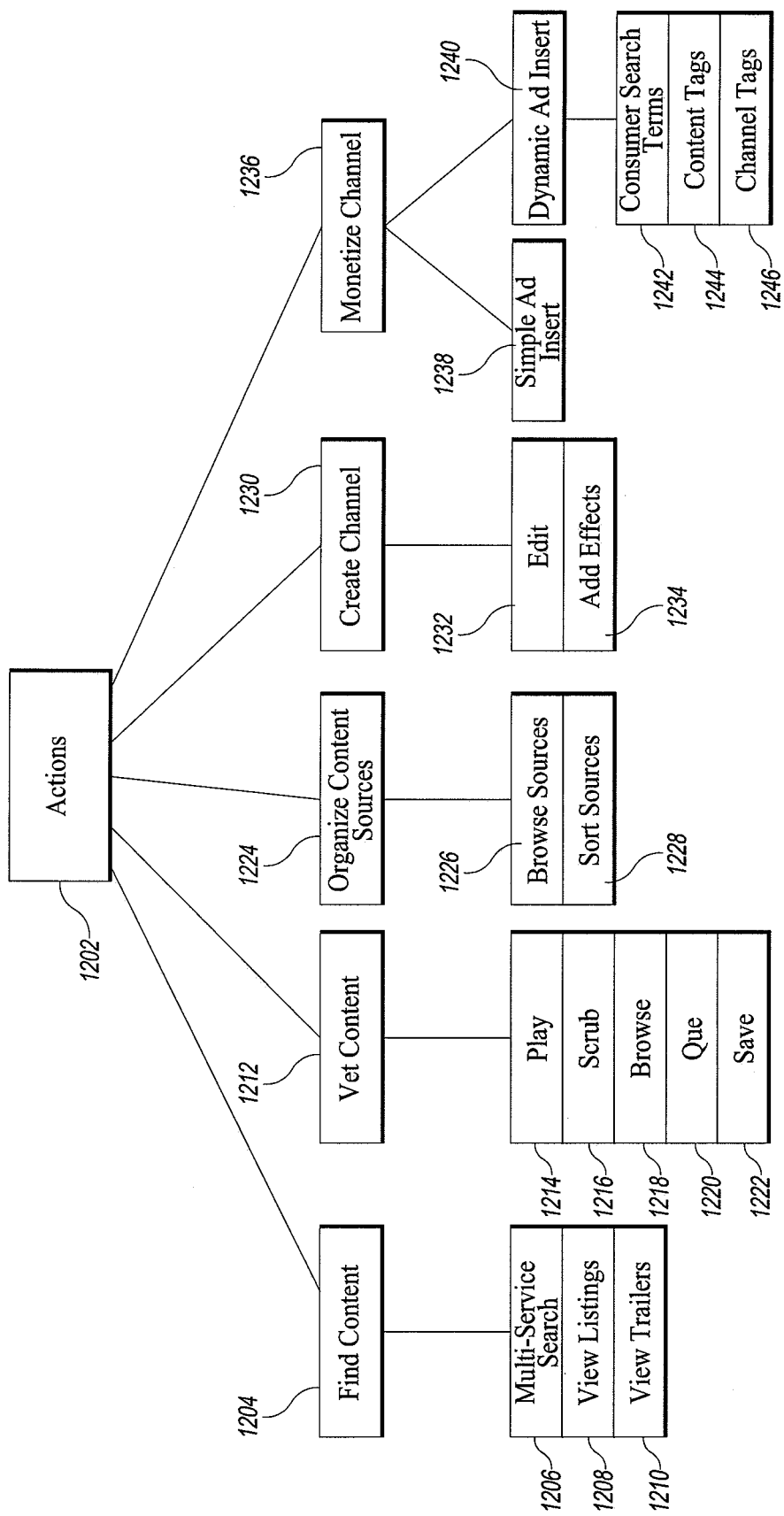
FIG. 12 shows a way of visualizing various methods by which users can interact with an embodiment of the invention as creators of content that consists of compilations of smaller components of content.

The final two categories of users of the subject invention are executive producers and network executives. For purposes of categorizing the actions they can perform with the subject invention, their tasks can be thought of as roughly equivalent, and the broad functions categorized as aggregation, as shown in FIG. 12. One class of actions 1202 an aggregator can perform is to find content 1204. There will be a variety of ways in which a person creating a program or network schedule can find new content. Aggregators will be able to search 1206 using general purpose search engines, site specific tools such as the search function on the YouTube website, or perhaps a specific search tool aimed at such content aggregators. Aggregators could also look 1208 at one or more sites that catalog and list various content creators and actual content. For example, an aggregator looking for background music could go to a site that lists composers who specialize in creating soundtracks, or a site that brings together instrumental music for video that is cataloged by genre, etc. An aggregator could also search for content by viewing trailers 1210 using a site that aggregates content solely or primarily for the purpose of presenting it to aggregators by letting content creators create short-form trailers or teasers intended to draw aggregators to look further into their work.

Another step that will generally be taken by aggregators is the vetting 1212 of content, which means the aggregator will watch and/or listen to segments or programs, and make preliminary decisions about potential suitability. Such vetting will include playing back content 1214, scrubbing 1216 through content, in order to speed the evaluation process. It may also include browsing 1218, which may consist of surfing through content pre-queued by the viewer in item 1220 below, or can consist of flipping through content advertised or recommended in the frame placed around the content the viewer had previously selected. (The B to C revenue models that allow content creators to monetize viewing of content by consumers can also be used to advertise to aggregators and thus in a B to B approach.) An aggregator can also queue 1220 content for future vetting, and can save 1222 promising content in folders, lists, bookmarks, etc.

Another function available to aggregators to organize 1224 content that has been found and/or vetted. Organization can comprise browsing 1226 through collected content, as well as sorting 1228 into useful groupings such as by use (e.g., for the show for the week of October 1st), or by type (e.g., football fumbles), etc.

Another function specific to network executives is channel creation 1230. In its simplest form, this will consist of assembling programs created as shown in FIG. 11. However, the process of creating a channel can involve many or even all of the steps described in FIG. 11—a network executive can edit existing programs for length, or otherwise in any of the ways discussed in FIG. 11; or can add effects 1234 in much the same way as shown in FIG. 11 in order to create transitions between individual programs or otherwise.

Finally, an aggregator can monetize 1236 the newly aggregated program or channel. This step can comprise simple ad insertion 1238, or it can be more complex dynamic ad insertion 1240. Dynamic ad insertion creates one or more slots into which advertising will be placed at the time of playback. Those ads can be tailored with varying specificity to what is known about a given viewer. In order to maximize the value of the ads inserted into a given channel's programming, a network executive may insert metadata into the channel workflow. Such metadata could include search terms 1242 to make it easier for consumers to find the channel; descriptions of the programs the channel broadcasts 1244, and descriptions of the channel 1244.

It should be noted that the creation of a channel is most easily accomplished by the creation of workflows analogous to the workflows that describe individual segments and individual programs.

As currently envisioned, there are three levels of participation in the content creation aspect of the invention. At the most granular level are creators of individual pieces of content; they will be referred to as writer/reporters, because their contributions are analogous to those of freelance writers and reporters in traditional broadcast media. They create individual pieces that may be a few seconds, a few minutes or even longer. Those pieces will be referred to as segments.

The second level of participation may be thought of as executive producers. Like executive producers in the Hollywood tradition, they are responsible for delivering longer programs that are comprised of smaller elements of content. These combinations can be as simple as straight assemblages, or as sophisticated and highly produced as a network television news telecast. These pieces will be referred to as programs.

Finally the third level of participation may be thought of as network executives. As in television, the network executive assembles programs into longer streams that the network executive believes will attract an audience. This packaging exercise is likely to involve the creation and promotion of a distinctive "brand". These compilations will be referred to as slates.

Figure 13:
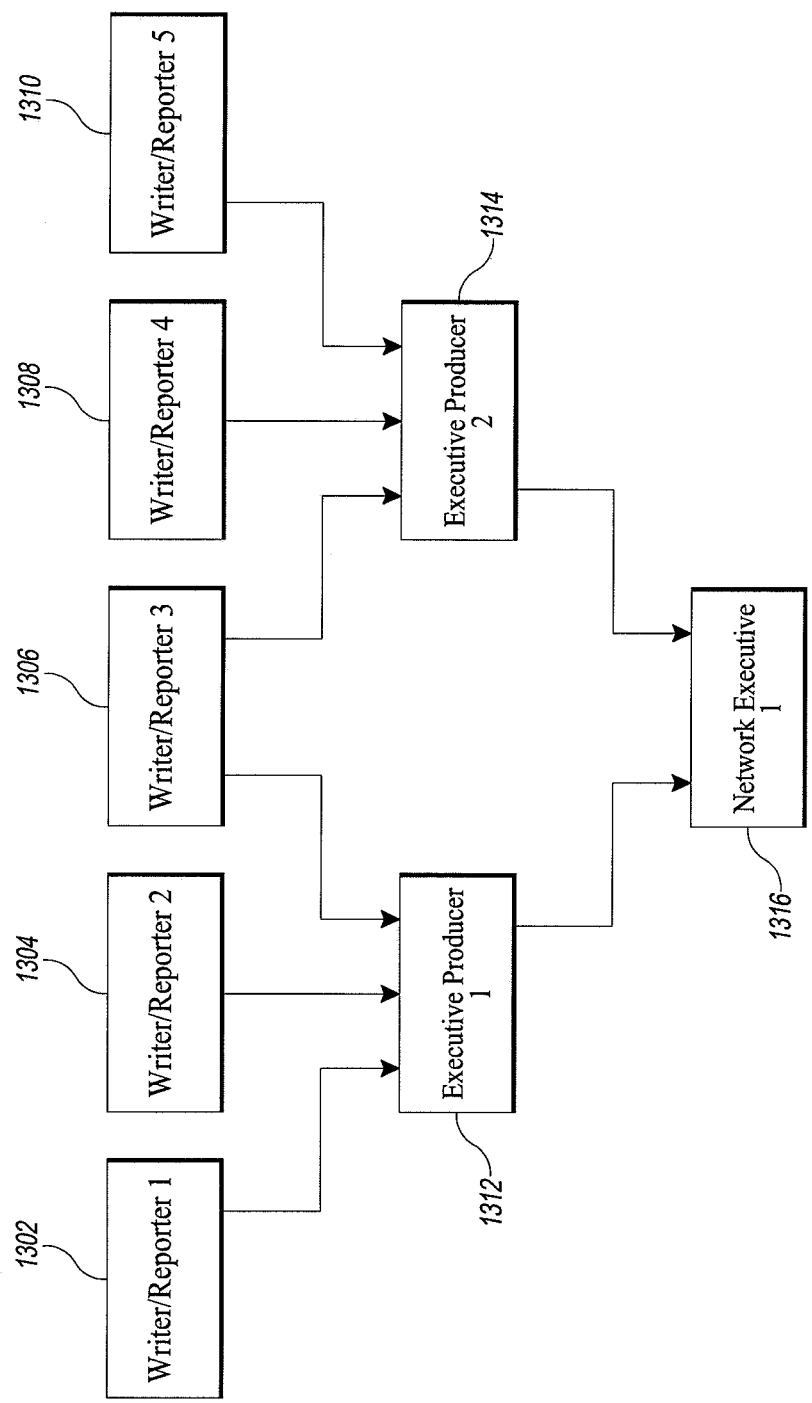
FIG. 13 shows a way of visualizing relationships between different content creators using an embodiment of the subject invention.

The relationships between these three types of participants is shown in FIG. 13.

Individual writer/producers 1302, 1304, 1306 and 1308 and 1310 create content at the most granular level. The segments they create are in turn assembled into programs by executive producers 1312 and 1314. Those programs are arranged into a longer schedule of programs by network executive 1316. Individual writer/reporters can produce content that is used by multiple executive producers to create different programs that may all contain common segments; executive producers can create programs that include content from an unlimited number of writer/reporters, and can sell their programs to multiple network executives; network executives can (if given appropriate digital rights) compile slates made up of an unlimited number of programs from an infinite variety of executive producers.

A key advantage of the subject invention is the opportunities it creates for highly targeted advertising for televisions-style programming. Advertising is the foundation of most business models for bringing media to users via the Internet. Initially, browser-based advertising consisted of banner ads that were served to all viewers. These ads proved to be of limited value to advertisers, and were quickly supplanted by advances in ad-serving technology. Advertising services began using browser history and other information stored in the viewer's computer in order to more narrowly target advertising to the preferences and habits of individual viewers. Thus if a browser user was looking at a website that sells women's shoes an hour ago, ads for women's shoes are likely to appear on many different websites for that user for an extended time. This ability to create highly personalized viewing experiences is highly prized by advertisers because it results in ads being more likely to be seen by the desired audience, thereby increasing the odds that a consumer will take the action desired by the advertiser.

With traditional broadcasting over the airwaves, such targeted advertising is not really possible. However, that does not mean that all viewers of the same national broadcast will see exactly the same commercials. When a network like CBS presents a program like a sitcom nationally, it can take some advertising slots for itself for national advertisers like beer and laundry detergent sellers, but it can also allocate some advertising slots to local affiliates to fill. This is why even highly-rated network programs may include ads for local used car dealers, restaurants, etc. But this coarse differentiation is limited to a single viewing experience to all of the viewers or listeners covered by a given broadcast signal, so that, for example, every viewer of WCBS in the New York metropolitan area will see the same ads even though the odds that viewers in NJ will frequent a restaurant on Long Island are poor.

Slightly more granular advertising is made possible by transmission of traditional programming via land-based systems like those used by cable TV providers. These systems permit broadcasters to leave advertising slots available for local advertisers. Thus it is possible for a cable operator to present a nationally broadcast program while serving some ads that are targeted to an individual county or even town, because, unlike a traditional broadcaster, the cable provider knows exactly where each viewer is located. However, the cable model is still essentially one-way in its information flow, and so the program a specific viewer last watched will have no effect on the advertising that is inserted in the program she watches next.

With the subject invention, all of the tools used to narrowly target advertising on the Internet can be brought to bear within traditional broadcast programming. Because the device presenting the content to users (internet-enabled TV, browser, or mobile device) is capable of two-way communication, it will also be capable of confirming that the ads were in fact played as intended (or, conversely, if they have been avoided). This feedback loop offers multiple benefits. First, it allows advertisers to pay for actual, confirmed viewer impressions in a way now commonplace on the Internet but not previously possible for television viewing. Second, it creates the possibility that advertisers can effectively "price discriminate"—that is, reduce the number of ads shown to casual viewers who may be easily driven to "change the channel" if a program is interrupted by too many ads, while in effect charging more to more loyal viewers who are believed to be loyal to a program and thus willing to put up with more advertising.

Figure 14:
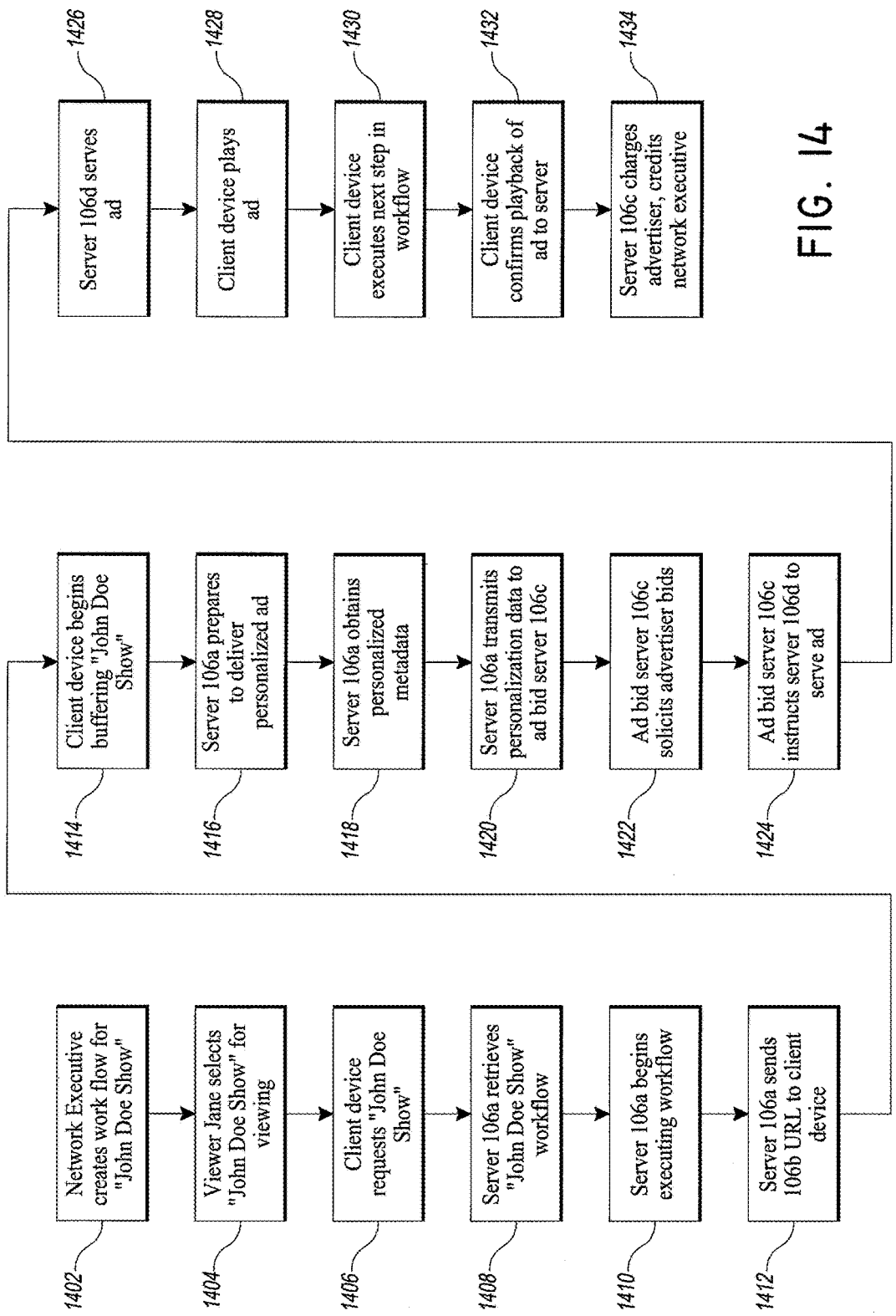
FIG. 14 shows a way of combining advertising with content created using an embodiment of the invention.

FIG. 14 illustrates the steps involved in order to insert targeted advertising when an established network executive uses the subject invention to make episode 8 of "The John Doe Show" available to hypothetical viewer Jane. (A similar process could be used to insert targeted advertising into an individual program or even individual element of content.) This flowchart assumes that some key business relationships have previously created. Specifically, it is assumed that the network executive has entered into an agreement with a service that delivers advertising to viewers of video content, and that the network executive has previously decided to permit viewers to access its content using the subject invention. In step 1402, the network executive creates a workflow for a slate that includes "The John Doe Show". That workflow will contain information about the video and audio files as previously described, but in order to take advantage of the targeted advertising features, it must also contain metadata specifically required in order to both serve ads as intended and to deliver revenue to the broadcaster. Such information may include time and geographic restrictions (if the network executive intends to limit viewing), the timing in the workflow where ads are permitted to be inserted, restrictions as to the type of ads that the broadcaster wishes to allow to be associated with its content (e.g., no tobacco, no hard liquor, etc.), or specific exclusions due to rights purchased by another advertiser either inside or outside the targeted advertising system (e.g., if Budweiser purchases the right to be the exclusive beer for the NBA Finals broadcast, the advertising service can be instructed that it cannot insert ads for Miller). Of particular interest to some network executives, the workflow may specify the extent to which a viewer can fast forward or rewind through the program in general, and through commercials in particular. This may be seen by some broadcasters as an effective way to prevent viewers from skipping ads, though it is likely that the ability of a network executive to enforce such restrictions will depend on the desirability and exclusivity of its content.

In step 1404, Jane selects The John Doe Show for viewing on her Internet-enabled television or other playback device 104. In step 1406 the browser or pseudo-browser on Jane's television or other playback device signals a server 106a operated as part of the subject invention that the device at a specific IP address (Jane's TV) has requested episode 8 of The John Doe Show. (This request could come as a stand-alone request for that show, or could be made as a function of watching the slate of programs compiled by the network executive, which in this case is assumed to include that program among others.

In step 1408 server 106a operating part of the subject invention retrieves the workflow that represents episode 8 of The John Doe show. In step 1410 server 106a begins executing the workflow. Assuming that, as in FIG. 8 above, workflows are executed on server 106a rather than on client 104, execution proceeds by transmitting to client 104 a page that includes a URL request to server 106b to begin streaming the John Doe show to Jane's TV. In step 1412 server 106b begins sending the John Doe Show to Jane's TV 104. In step 1414 Jane's TV 104 buffers enough of the show (determined based upon the speed of the connection, buffer size in Jane's TV, user preferences, etc.) to ensure smooth, uninterrupted playback. In step 1416 server 106a begins to execute the next step in the workflow, which involves playing a personalized advertisement. In step 1418, server 106a queries various sources for data to be used to determine which ad should be served. The data sources offer insights about Jane's preferences and viewing habits. Thus the server can retrieve data from a memory cache in the browser on Jane's TV 104 showing that it had been used to watch four hours of Tour de France coverage, a program about wind tunnels and a biography of Lance Armstrong in the past week. If Jane has used her web-enabled TV to make any purchases, information about what was bought may be transmitted as well. The server for the subject invention may also store information about the activity in Jane's accounts on other devices—if she has used a computer or smart phone to view content, information related to activity on these devices can be used as well.

Once the data about the viewer has been gathered, in step 1420 server 106a transmits the personalization data to an advertising bid server 106c. In step 1422, the advertising server determines willingness of various advertisers to pay to insert the first ad into Jane's viewing of The John Doe Show. The composite picture of Jane that arises from her viewing and purchasing history will determine how much the advertising slot is worth to various advertisers. Given that Jane's history contains strong hints that someone in her household is very interested in bicycling, it is likely that that a company that sells cycling-related products or services will be likely to highly value the opportunity, while advertisers selling, say, children's toys might offer much less.

In step 1424, advertising bid server 106c accepts the bid of the winning advertiser and instructs the advertiser's server 106d to transmit the winning ad to Jane's TV 104. The workflow will permit the advertising auction to occur prior to the time the ad will be viewed, so that Jane's TV can effectively cache the ad and present it when called for by the workflow even if there are some problems with connectivity.

In step 1426, server 106d serves the winning ad to Jane's TV. In step 1428 Jane's TV 104 reaches the point at which a commercial break is scheduled, and begins playing the winning ad.

In step 1430, Jane's TV 104 completes the playback of the ad and moves to the next step in the workflow. That step may be playback of the next segment of The John Doe Show, or it may be another ad, or it may be to play the next program in the network executive's slate, or it may be to begin another program that Jane has previously programmed into her own custom schedule.

In step 1432, Jane's TV 104 sends a message (either directly or through server 106a) to the advertising bid server 106c confirming that the ad has been played.

In step 1434, the advertising bid server 106c charges the advertiser's account with the amount the advertiser has agreed to pay for that viewing of its ad, and credits the network executive's account with the appropriate amount of revenue for the ad. (These amounts are likely to be different in order to compensate the advertising bid aggregator and other intermediaries for the value of their services.)

It should also be noted that the subject invention permits a new form of interactivity between broadcasters and viewers. Advertisements do not have to be like traditional TV ads that simply tried to inform or persuade viewers to use a product in the future. They can instead be a more evolved version of the direct marketing. For example, an advertisement during "The John Doe Show" could be placed by a competing network to promote "The Jim Smith Show". But the ad could go further than merely promoting the show in the abstract. The ad could also include a specific call to action ("click here to start watching now") and offer highly specific incentives ("Jane—click now to see Jim Smith without commercial interruption," or "Jane—get a $1 credit at Amazon by watching Jim Smith now.")

It should also be noted that using an inexpensive video cameras such as those now widely integrated into laptop computers and smart phones creates an additional application for the subject invention. In traditional broadcast television, many people see commercial breaks as an opportunity to get up and accomplish a task (get food, go to the bathroom, etc.) that may mean the commercials go unseen. In the traditional context, there was no way (beyond statistical inference) to be certain an ad was actually seen. By accessing the video feed from a camera integrated into or otherwise associated with the viewing device, and processing the data from that video feed, a broadcaster can confirm exactly how many people saw a given commercial. Indeed, by monitoring information from the video camera, an advertising intermediary can select optimal advertisements based upon who is actually watching at a given time. So, for example, if image processing on the image received from a given camera reveals that three adult males in Philadelphia are watching a football pre-game show for a game happening in that city that has not been sold out, a ticket reseller could offer up 3 tickets to the game to them.

A useful aspect of the subject invention is that the pairing of programming and advertising happens in near real time. This provides key benefits to broadcasters. One of the reasons broadcasters tend to fight to prevent or restrict time shifting and recording of content by users, and the re-broadcasting of programs by third parties, is that creating such temporal and business distance between the original broadcast and the subsequent viewing (and viewers) can greatly degrade their value to the original advertisers. But the subject invention prevents advertising from becoming stale or inappropriate, because it allows ads that are not only individually targeted, but extremely current relative to the time the show is viewed. The subject invention also allows the network to make it impossible to view the content without watching the ads the network inserts (or instructs others to insert) into the stream, or to make commercial-free viewing available only to those who pay for that privilege. Thus it becomes possible for a major network to "mass customize" the advertising seen by each of its viewers, even if those viewers number into the tens of millions, and even if those viewers are watching the program an hour or a month after its original broadcast.

A specific example of how the subject invention can be used by multiple parties in different roles in order to create programs and slates of programs.

A football fan (call him Alpha) can be a writer/reporter and create a segment analyzing the football games played over a recent weekend. Alpha follows this process to create a segment. First, he searches various online sources (that may or may not have been created using the subject invention) for video footage on which he wants to comment. Assume that Alpha wants to analyze a play in a professional football game in which a penalty flag was thrown. Alpha locates slow-motion footage of the play in question online, and sees something he believes the referees and sportscasters missed. He copies the URL of the footage into the editing tool. The tool does not create a new copy of the video; rather it creates a new frame in which the video can be viewed and new content can be superimposed. He then uses the editing tool to trim the length of the video footage to the relevant length. The tool uses timing information to synchronize playback so that the relevant segment appears at the right moment. He then uses an advanced function such as a "freeze frame" function in the tool to pause the video at the key point. The tool sets up the pause command in the metadata in the workflow, essentially recording a macro to execute the command on the source URL. Alpha then uses another advanced function such as a pan and zoom command to focus on the place in the image where, say, a player stepped out of bounds. Alpha may then layer on top of the image a Telestrator image of a circle around the player's foot stepping out of bounds.

Having created this key portion of the video segment, Alpha then uses his own webcam to record an introduction consisting of his own discussion of the context of the play. He then records his own voiceover to play during playback of the video composite previously created. Finally, he adds in a short title sequence identifying himself, his own branding and any additional metadata he wishes to attach to the segment (e.g attribution, advertising rules, etc). Optionally, he creates a slot for one or more advertisements.

As a final step, he uploads the final version of the clip to his online video gallery. T his process will consist of two distinct pieces. The first will occur regardless of the source of the content of the video used in the segment. It consists of uploading the "workflow" information that characterizes the segment. The second aspect of the process is the uploading of content created by Alpha (as opposed to content that already exists and was incorporated via the workflow file) to an online video site. In the currently preferred embodiment, the second step will actually occur prior to the first step, so that the URL for each piece of uploaded content is determined and saved into the metadata prior to finalizing and uploading the metadata.

In addition, Alpha may choose to upload the completed segment to one or more hosted video websites, such as YouTube, Vimeo, etc. In this case what is actually uploaded is likely to be the final product (that is, the frame-by-frame sequence of pixels and audio of the as-viewed final output) rather than just a workflow file.

The creation of shows from individual segments is illustrated by a producer (call him Beta) who specializes in assembling programs about football. Beta begins putting together a half-hour show about the previous week's games. He can become aware of Alpha's segment in a variety of ways. He can find Alpha's segment on YouTube; he might be a subscriber to a feed that informs him whenever trusted (or "liked") writer/reporters have created new segments; he might have seen Alpha's segment on another program, etc. In the currently preferred embodiment, Beta does not need to negotiate rights with Alpha, because when Beta incorporates Alpha's segment into Beta's program, Beta is not taking anything from Alpha—when a viewer of Beta's program views Alpha's segment from within a "workflow" or frame created by Beta, but the video is still sourced from the hosted service where Alpha has uploaded it. Any advertising inserted by Alpha will still play. Alpha loses nothing when Beta's show instantiates Alpha's segment; instead he potentially gains significant traffic, greater visibility among the audience he is seeking to attract, etc, though Beta may negotiate with Alpha to give Alpha a cut of Beta's advertising revenue if Alpha agrees to disable his ads. If Alpha wishes to restrict repackaging of his content, he can include the relevant restrictions in the metadata embedded in each content file.

Beta watches the segment created by Alpha, and decides he wants to include it in his program, together with segments from other writer/reporters. Beta assembles a program in much the same way that Alpha created his short segment— editing segments for length and clarity, adding new content in the form of commentary or introduction, adding graphics, music, etc. Beta can also add advertising slots.

Beta may operate on "spec"—creating content with no pre-existing arrangement with a network executive—or may work on contract, so that Beta could have pre-arranged to deliver a 30 minute segment every week for a certain number of weeks in exchange for exclusivity, cash, etc. Absent such arrangements, viewers will be able to seek out (or find via search engine) and watch Beta's show without intermediation by a network executive.

Then a network executive (Gamma) who has developed a following for interesting content on her sports channel, creates a "slate"—a series of programs including the football shows from Beta. The schedule may be locked (i.e., a given show "airs" at a specific time in the same way that television programming has traditionally been offered) or floating, and available at any time. The network executive can limit territories from which the content can be viewed (or not). The network executive can insert advertising, insert additional content in the form of lead-ins, commentary, etc. It is also anticipated that all participants will be able to engage in promotional activities intended to drive traffic to their content, but that this activity is likely to be most effective and most pervasive at the network level.

It will also be possible for network executives to create dynamic slates—that is, to create heuristic-based workflows such that what one viewer sees and/or hears when tuning into a specific slate or program could be different from what is seen and heard by another viewer tuned to the same program or slate. A heuristic-based workflow can vary basic personalization elements such as language preferences, bandwidth consumed and which (and how many) commercials are shown, but can also vary other aspects of the program as well.—longer and shorter versions of the same show, different camera angles, even changing substantive content within a given program based on the preferences of the viewer.

Finally, viewers will be able to assemble their own schedules, and share those schedules with friends.

Writer/producers will be able to offer content under a variety of terms. Some may contract with individual producers for exclusive content; others may offer the same content to as many producers as wish to use it. The same could apply in the relationships between producers and network executives.

It should also be noted that a single person or entity could perform all three functions herself or itself.

One opportunity for revenue generation through advertising involves the interplay between different layers in the ecosystem. If a writer/producer inserts too much of his own advertising into a segment the segment will have reduced appeal to producers; if a producer puts too many ads in a program, the program will have reduced appeal to a network exec. It is likely that norms will emerge as the ecosystem develops—for example, segments shorter than 2 minutes might not be long enough to contain any ads; segments between 5 and 10 minutes might contain up to 2 ads, etc.

Alternatively, there could be a marketplace for ads that allows the number of ads in a segment or a show to be dynamic, following heuristics that take into account the popularity of a given piece of content, the popularity of the higher levels of programming that incorporate the segment, the demographics of the audiences of each of the participants, etc.

Finally, the arrangement of ads and allocation of revenue from them can be explicitly negotiated between the parties.

Another possible revenue model would be for viewers to be offered an ad-free version of the service in exchange for a paid subscription. This could be arranged through, for example, a broadband provider. The broadband provider would then pay for the content "consumed" by its subscribers. This revenue could be filtered through the network/show/segment hierarchy as in traditional media, or could be centralized through a traffic tracking service that permits participants in the ecosystem to accurately measure who consumes what content.

It is currently assumed that advertising will be minimal in the early stages of adoption of the invention; furthermore, it is expected that individual writer/reporters, producers and network executives will offer content with minimal embedded advertising until they develop an audience.

From the viewer standpoint, the invention would offer ways to "follow" preferred providers of content. If a viewer watched several shows produced by Beta, the viewer's browser could recommend other shows from Beta, or perhaps cache them locally. If the viewer has seen multiple segments from Alpha, the browser can recommend other programs that include Alpha's content.

The subject invention can also be employed by commercial broadcasters to enable profitable anytime, anywhere viewing of their programming. In order to leverage the subject invention, the broadcaster must first create the necessary infrastructure. This may consist of creating digital files in a format that is compatible with browsers or other software found in the devices that are generally used to view video content on the web. The other essential step will be to create workflows supporting the playback of the content. This task can be accomplished manually: a human editor can take raw broadcast footage, complete with its original advertising if that is all that is available, and use the editing tools described in FIGS. 4 and 5 above to insert metadata about the location of commercials, breaks between programs, titles and descriptions of each show, etc. It can also largely be automated: if the broadcaster already includes metadata workflows into its broadcast stream, the additional post-broadcast step of creating the workflow may be largely or even completely avoided.

The process may be illustrated with a concrete example. A Turkish television network broadcasts all of the games of the Kasimpaşaspor club. The audience in Turkey for these games is quite large, but there may be a few hundred thousand Turkish emigrants scattered around the globe who would like to watch the games as well, as well as business travelers, tourists, etc., who find themselves outside the broadcast area at game times. It would be advantageous to the broadcaster to monetize these viewers. The Turkish broadcaster could put an unrestricted live feed on the Internet, but would fear (with justification) losing control of a copyrighted, expensive-to-produce asset, loss of advertising revenue in the home market, etc. Even if most of those geographically disparate viewers actually watched the embedded ads for Turkish products and merchants, their value to those advertisers may be low.

If instead the broadcaster makes the games available using the subject invention, the workflow permits the broadcaster to maximize its ability to monetize its content. Once the broadcaster has uploaded a game in a compatible format and ensured that appropriate metatags are included in the accompanying workflow files, the game can be viewed by viewers anywhere in the world (if the workflow is so provisioned by the broadcaster). It should be possible to accomplish this process in near real time or even real time, so that broadcasters could use the subject invention to broadcast high-value, time-critical programming such as major sporting events in parallel with or even instead of traditional broadcasting without sacrificing revenue. At the points in the stream where the audience for the original broadcast would see commercials targeted to that audience, the workflow permits the streaming of commercials targeted to the each individual viewer. So a Turkish emigrant watching on a computer in Santa Monica Calif. could be served a commercial for a Turkish restaurant in Westwood, or for a Mediterranean market in Culver City, while a business traveler watching on an Internet-enabled TV in a hotel in London might see ads for Turkish Airways.

The subject invention can also optimize not merely how a given commercial break is filled with targeted ads, but can also dynamically adjust the number of ads server to individual viewers. Simply by changing metadata in the workflow, the Turkish broadcaster can expand or contract the size of the commercial breaks as desired. The commercial delivery and accounting functions of the instant invention will maximize revenue for the broadcaster, thereby incentivizing the broadest possible availability of that broadcaster's content. The subject invention can also be used to permit the broadcaster to delegate decisions about the length of commercial breaks to another aspect of the invention. For example, the advertising server may have the ability to use cookie-based or other data to determine not just that the emigrant in Los Angeles should see ads for Southern California businesses, but that this particular viewer will continue to watch the game even if what was a 90 second commercial break in the broadcast is stretched to three minutes. And of course the workflow can be used to restrict the ability of viewers to skip commercials or even, if desired, to fast-forward through the core programming.

It should also be noted that the subject invention can apply to audio-only content, thereby allowing for the easy creation of "radio" programming. As Internet radio becomes more widely available, and as voice-control operation of personal electronic devices becomes more widespread and more sophisticated, the ability to access web-based audio content in automobiles and other mobile contexts will be of real value.

What is claimed is:

1. A method that uses a workflow file on a first computer to determine playback of audio and video content on a second computer, wherein said audio and video content is combined with advertisements that are to be viewed by a user over a network on said second computer capable of playing such audio and video content, said method comprising:
   storing, at a first computer, a workflow file comprising at least a plurality of source identifiers for a plurality of media files, said workflow file further comprising a plurality of playback parameters associated with said playback, wherein said playback parameters comprise: at least starting points and ending points of said plurality of media files, layering information, advertisement information, and time information defining when to send source indicators to a second computer;
   representing at least a first source identifier of at least a first media file audio and/or video stored on at least a computer other than said first computer and said second computer, said first media file accessed over the network, wherein said first source identifier comprises as at least a first uniform resource indicator corresponding to a location of said first media file on said network;
   representing at least a second source identifier of at least a second media file comprising audio and/or video stored on at least a computer other than said first computer and said second computer, said second media file accessed over the network, wherein said second source identifier comprises at least a second uniform resource indicator corresponding to a location of said second media file on said network;
   representing at least a third source identifier of at least a third media file comprising a first advertisement, said third media file accessed over the network, wherein said third source identifier comprises at least a third uniform resource indicator corresponding to the location of said third media file on said network;
   representing at least a fourth source identifier of at least a fourth media file comprising a second advertisement accessed over the network, said fourth source identifier accessed over the network, wherein said fourth source identifier comprises at least a uniform resource indicator corresponding to the location of said fourth media file on said network;
   accessing personalization data stored on said second computer, said personalization data comprising each of: at least a portion of the browsing and viewing history of said second computer, location-related information about said second computer, and information about said second computer;
   directing said second computer to access said first media file and to play back on said second computer said first media file;
   sending a request to determine status of playback of said first media file on said second computer and based on progress of the playback of said first media file, executing said workflow to direct said second computer to access either said third media file or said fourth media file such that playback of said first advertisement or said second advertisement or any portion thereof may not be skipped by a viewer; and
   upon confirmation by said first computer that playback of either said third media file or said fourth media file has been completed, directing said second computer to access said second media file and play back on said second computer said second media file.

2. The method of claim 1 in which said plurality of media files are located on a plurality of servers.

3. The method of claim 1 in which said network is the Internet.

4. The method of claim 1 in which said second computer is a mobile device.

5. The method of claim 1 in which said second computer is a television.

6. The method of claim 1 in which said second computer is a personal computer.

7. The method of claim 1 in which said first advertisement comprises audio and video content.

8. The method of claim 1 in which said first advertisement comprises only video content.

9. The method of claim 1 in which said personalization data comprises metadata.

10. The method of claim 1 in which said location-related information comprises location data derived from a satellite-based global positioning system regarding said second computer.

11. A system that uses a workflow file on a first computer to determine playback of audio and video content on a second computer, wherein said audio and video content is combined with advertisements that are to be viewed by a user over a network on said second computer or other device capable of playing such audio and video content, said system comprising:
   a workflow file stored on a first computer comprising computer hardware, wherein said first computer is in communication with a network, the workflow file comprising at least a plurality of source identifiers for a plurality of media files, said workflow file further comprising a plurality of playback parameters associated with said playback, wherein said playback parameters comprise: at least starting points and ending points within portions of said plurality of media files, layering information, advertisement information, and time information defining when to send source indicators to a second computer;

wherein at least a first source identifier in said workflow file references at least a first media file comprising audio and/or video stored on at least a computer other than said first computer and said second computer, said first media file accessed over the network, wherein said first source identifier comprises at least a first uniform resource indicator corresponding to a location of said first media file on said network;

wherein at least a second source identifier in said workflow file references at least a second media file comprising audio and/or video stored on at least a computer other than said first computer and said second computer, said second media file accessed over the network, wherein said second source identifier comprises at least a second uniform resource indicator corresponding to the location of said second media file on said network;

wherein at least a third source identifier of at least a third media file comprising a first advertisement, said third media file accessed over the network, wherein said third source identifier comprises at least a third uniform resource indicator corresponding to the location of said third media file on said network;

wherein at least a fourth source identifier of at least a fourth media file comprising a second advertisement, said fourth media file accessed over the network, wherein the fourth source identifier comprises at least a fourth uniform resource indicator corresponding to the location of said fourth media file on said network;

an application executing on one or more computer processors, said application configured to access personalization data stored on said second computer, said personalization data comprising each of at least a portion of the browsing and viewing history of said user of said second computer, location-related information about said second computer, the language preferences of said user, and information about said second computer;

wherein said application directs said second computer to play back said first media file between the starting and ending points of said first media file defined in said playback parameters in said workflow file;

wherein said application sends a request to determine status of playback of said first media file on said second computer and based on progress of the playback of said first media file, executing said workflow to direct said second computer to access either said third media file or said fourth media file such that playback of said first advertisement or said second advertisement or any portion thereof may not be skipped by a viewer; and upon confirmation by said first computer that playback of either said third media file or said fourth media file has been completed, directing said second computer to access said second media file and play back on said second computer said second media file.

12. The system of claim 11 in which said plurality of media files are located on a plurality of servers.

13. The system of claim 11 in which said network is the Internet.

14. The system of claim 11 in which said second computer is a mobile device.

15. The system of claim 11 in which said second computer is a television.

16. The system of claim 11 in which said second computer is a personal computer.

17. The system of claim 11 in which said first advertisement comprises audio and video content.

18. The system of claim 11 in which said first advertisement comprises only video content.

19. The system of claim 11 in which said personalization data comprises metadata.

20. The system of claim 11 in which said location-related information comprises location data derived from a satellite-based global positioning system regarding said second computer.

* * * * *